US008320814B2

(12) United States Patent
Tsukamoto et al.

(10) Patent No.: US 8,320,814 B2
(45) Date of Patent: Nov. 27, 2012

(54) LENGTH MEASUREMENT APPARATUS AND IMAGE FORMING APPARATUS

(75) Inventors: Kazuyuki Tsukamoto, Minato-ku (JP); Takao Furuya, Ebina (JP); Minoru Oshima, Ebina (JP); Yoshinari Iwaki, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 378 days.

(21) Appl. No.: 12/775,238

(22) Filed: May 6, 2010

(65) Prior Publication Data

US 2011/0058828 A1 Mar. 10, 2011

(30) Foreign Application Priority Data

Sep. 10, 2009 (JP) ................................ 2009-208758
Feb. 8, 2010 (JP) ................................ 2010-025934

(51) Int. Cl.
*G03G 15/00* (2006.01)
*G01B 5/02* (2006.01)
*B65H 7/02* (2006.01)

(52) U.S. Cl. .................... 399/389; 271/265.02; 702/163

(58) Field of Classification Search .................... 399/45, 399/389; 271/265.02; 33/734, 772; 73/1.81; 702/97, 158, 159, 163
See application file for complete search history.

(56) References Cited

U.S. PATENT DOCUMENTS 3,197,137 A * 7/1965 Watson .................. 235/103.5 R
4,849,915 A * 7/1989 Worsley et al. ............... 702/163
5,430,665 A * 7/1995 Jin et al. ........................ 702/163
5,689,759 A * 11/1997 Isemura et al. ................. 399/45
6,853,948 B2 * 2/2005 Jewell ........................... 702/158
7,445,209 B2 * 11/2008 Sano et al. .................... 271/263
7,775,519 B2 * 8/2010 Takahashi et al. ....... 271/258.01
7,984,905 B2 * 7/2011 Yasumoto ................ 271/265.02
2010/0247115 A1 * 9/2010 Ohshima et al. ................ 399/16
2010/0329759 A1 * 12/2010 Furuya et al. ................. 399/389
2011/0020020 A1 * 1/2011 Ohshima et al. ................ 399/45
2011/0064425 A1 * 3/2011 Kazama et al. ................. 399/16
2011/0076077 A1 * 3/2011 Morofuji et al. .............. 399/389

FOREIGN PATENT DOCUMENTS

JP 05-208534 A 8/1993
JP 2005-112543 A 4/2005

* cited by examiner

*Primary Examiner* — Robert Beatty
(74) *Attorney, Agent, or Firm* — Sughrue Mion, PLLC

(57) ABSTRACT

A length measurement apparatus including: a measurement portion that measures a sheet length based on a rotational amount of a length measurement roll for a first detection period in which first and third sensors detect the sheet, and a sheet length based on a rotational amount of the length measurement roll for a second detection period in which the second sensor and any one of the first and third sensors detect the sheet, the any one of the first and third sensors being disposed at a position opposite to the second sensor via the length measurement roll; and a whole length calculation portion that selects the sheet length nearer to integral multiples of the circumference length of the length measurement roll from the sheet lengths measured for the first and second detection periods, and calculates the whole length of the sheet by using the selected sheet length.

18 Claims, 20 Drawing Sheets

LENGTH MEASUREMENT APPARATUS AND IMAGE FORMING APPARATUS

CROSS-REFERENCE TO RELATED APPLICATION

This application is based on and claims priority under 35 USC 119 from Japanese Patent Application No. 2009-208758 filed on Sep. 10, 2009 and Japanese Patent Application No. 2010-025934 filed on Feb. 8, 2010.

BACKGROUND (i) Technical Field

The present invention relates to a sheet length measurement apparatus and an image forming apparatus.

(ii) Related Art

Conventionally, there has been known a technique that detects a length of a sheet on which an image is formed.

SUMMARY

According to an aspect of the present invention, there is provided a length measurement apparatus including: a length measurement roll that comes in contact with a sheet conveyed on a conveying path, and rotates along with the conveyance of the sheet; a first sensor that is disposed on an upstream side of the length measurement roll in a sheet conveying direction, and detects the sheet conveyed on the conveying path; a second sensor that is disposed on the upstream side or a downstream side of the length measurement roll in the sheet conveying direction, and detects the sheet conveyed on the conveying path; a third sensor that that is disposed on the downstream side of the length measurement roll in the sheet conveying direction, and detects the sheet conveyed on the conveying path; a measurement portion that measures a first sheet length of the sheet based on a rotational amount of the length measurement roll for a first detection period in which the first and third sensors detect the sheet, and measures a second sheet length of the sheet based on a rotational amount of the length measurement roll for a second detection period in which the second sensor and any one of the first and third sensors detect the sheet, the any one of the first and third sensors being disposed at a position opposite to the second sensor via the length measurement roll in the sheet conveying direction; and a whole length calculation portion that selects the sheet length nearer to integral multiples of the circumference length of the length measurement roll from the first and second sheet lengths, and calculates the whole length of the sheet in the sheet conveying direction by using the selected sheet length.

BRIEF DESCRIPTION OF THE DRAWINGS

Exemplary embodiments of the present invention will be described in detail based on the following figures, wherein:

FIG. 7A is a diagram showing examples of signal waveforms output from a first upstream edge sensor, the downstream edge sensor, and a rotary encoder;

FIG. 7B is an enlarged diagram showing waveforms of output signals of the downstream edge sensor and the rotary encoder in the vicinity where the output signal of the downstream edge sensor is on;

FIG. 7C is an enlarged diagram showing waveforms of output signals of the first upstream edge sensor and the rotary encoder in the vicinity where the output signal of the first upstream edge sensor is on;

DETAILED DESCRIPTION

Figure 1:
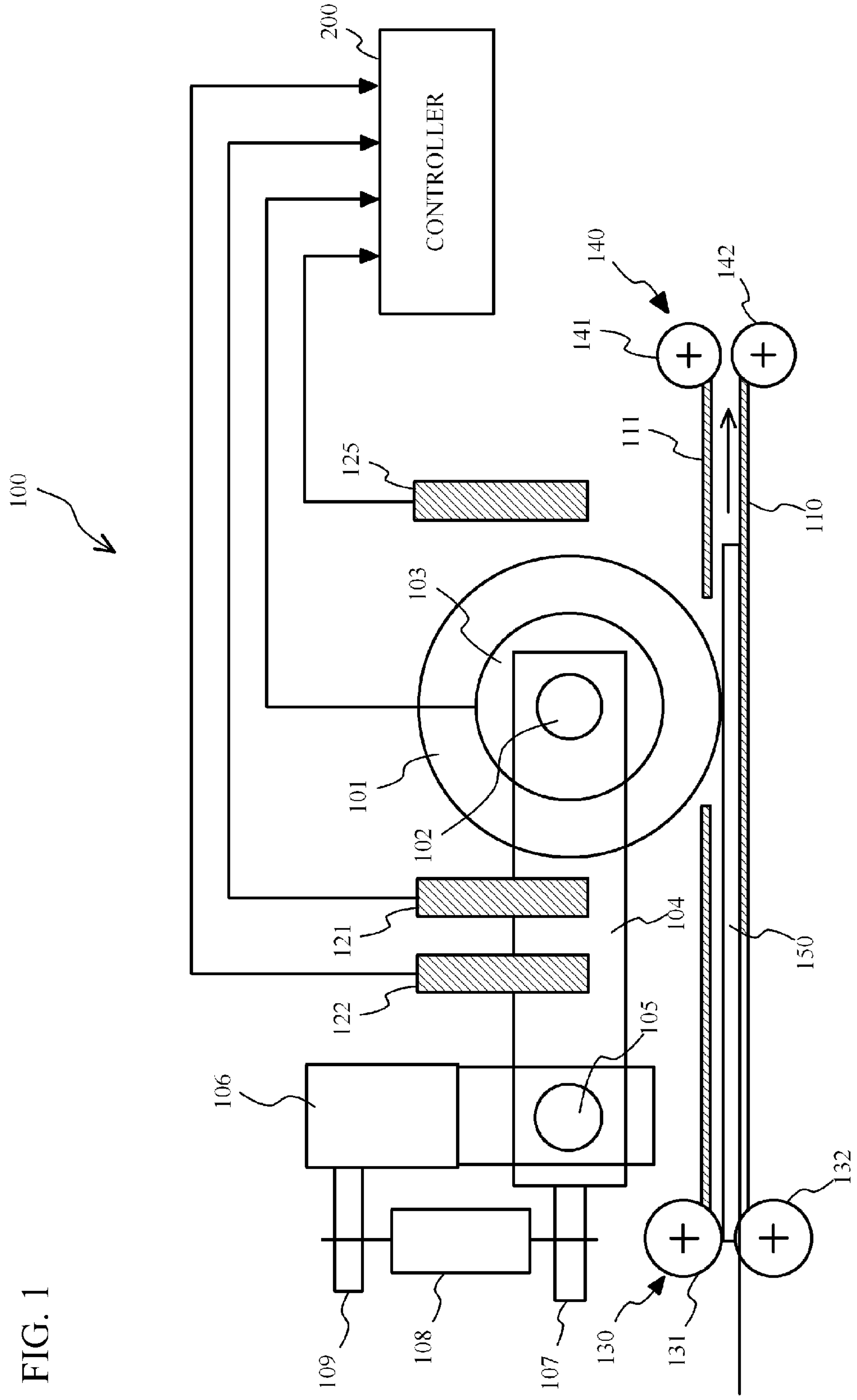
FIG. 1 is a diagram showing an example of a construction of a length measurement apparatus according to a first exemplary embodiment.

A description will now be given, with reference to the accompanying drawings, of an exemplary embodiment of the present invention.

First Exemplary Embodiment (Explanation of an Example of the Construction of a Length Measurement Apparatus)

First, a description will be given of a construction of a length measurement apparatus 100 of an exemplary embodiment, with reference to FIG. 1. A length measurement apparatus 100 of the exemplary embodiment includes a length measurement roll 101 that is an example of a rotary member for measurement. The length measurement roll 101 is composed of a hollow cylindrical shape, and includes a rotating shaft 102 at the center of the length measurement roll 101. A rotary encoder 103, which is an example of a detection means detecting a rotational amount of the length measurement roll 101, is provided at the rotating shaft 102 of the length measurement roll 101. The rotary encoder 103 outputs a pulse signal to a controller 200 described later whenever the length measurement roll 101 rotates by a given angle.

One end of a swinging arm 104 is installed in the rotating shaft 102 of the length measurement roll 101. The swinging arm 104 rotatably supports the rotating shaft 102 of the length measurement roll 101. Another end of the swinging arm 104 is installed in a swinging arm support member 106 with a swinging shaft 105 in a state where the swinging arm 104 can swing. The swinging arm support member 106 is fixed to a housing, not shown, of the length measurement apparatus 100.

An extended arm 107 extends from an end of the swinging arm 104 opposite to another end of the swinging arm 104 in which the length measurement roll 101 is installed. One end of a coil spring 108 is installed in the extended arm 107. Another end of the coil spring 108 is installed in an arm 109 extended from the swinging arm support member 106. The coil spring 108 is in an extended state, and generates a force to rotate the swinging arm 104 in a clockwise direction of FIG. 1. The coil spring 108 applies the force of the clockwise direction of FIG. 1 to the swinging arm 104, so that length measurement roll 101 is pressed against a conveying path (i.e., a lower conveying surface 110) of a sheet 150 by a given pressure.

A lower conveying surface 110 and an upper conveying surface 111 are disposed in opposite directions, and provided along the conveying path conveying the sheet 150. The upper conveying surface 111 is disposed so as to provide a predetermined gap away from the conveying surface 110. The lower conveying surface 110 and the upper conveying surface 111 are plate members, and have a role to restrict the conveyance of the sheet 150. The sheet 150 is conveyed while coming in contact with the lower conveying surface 110, and further receives the restriction of the upper conveying surface 111 so as not to be displaced upward.

The sheet 150 is a record material of the sheet shape, and a paper material to form an image. Besides the paper material, a sheet made of a resin used for an OHP sheet, and a sheet in which the coating of a resin film is given to a surface of the paper material can be used as the record material.

A first upstream edge sensor 121 and a second upstream edge sensor 122 are disposed in an upstream side of the length measurement roll 101. A downstream edge sensor 125 is disposed in a downstream side of the length measurement roll 101. The sheet 150 is conveyed on the conveying path from a side of the first upstream edge sensor 121 to that of the downstream edge sensor 125. Therefore, an edge sensor disposed at an upstream side of the length measurement roll 101 in a sheet conveying direction is referred to as the "upstream edge sensor", and an edge sensor disposed at a downstream side of the length measurement roll 101 in the sheet conveying direction is referred to as the "downstream edge sensor". It should be noted that a reason to install two edge sensors on the upstream side of the length measurement roll 101 will be described later.

The first upstream edge sensor 121, the second upstream edge sensor 122, and the downstream edge sensor 125 are photoelectronic sensors, each of which is composed of a LED (Light Emitting Diode) and a photo sensor. Each of the first upstream edge sensor 121, the second upstream edge sensor 122, and the downstream edge sensor 125 optically detects the passage of the sheet 150 to be conveyed, at a detection position of the sheet 150. Sensor signals output from the first upstream edge sensor 121, the second upstream edge sensor 122, and the downstream edge sensor 125 are transmitted to the controller 200. The controller 200 is a computer, and has a function that calculates the length of the sheet 150 in the conveying direction, and a function as a control device of the image forming apparatus, described later. These functions will be described later.

An upstream conveying roll 130 is disposed on the conveying path of the upstream side of the second upstream edge sensor 122, and a downstream conveying roll 140 is provided on the conveying path of the downstream side of the downstream edge sensor 125. The upstream conveying roll 130 includes conveying rolls 131 and 132 as a pair of rolls. Similarly, the downstream conveying roll 140 includes conveying rolls 141 and 142 as a pair of rolls. The conveying roll 132 of the upstream conveying roll 130 and the conveying roll 142 of the downstream conveying roll 140 are driven with a motor, not shown. The conveying roll 131 and the conveying roll 141 rotate by receiving driving forces of the conveying roll 132 and the conveying roll 142, respectively.

The length measurement roll 101 may be disposed on a side of the sheet 150 where the conveying rolls 132 and 142 are disposed (i.e., a lower side of the sheet in FIG. 1). However, in the first exemplary embodiment, the length measurement roll 101 is disposed on another side of the sheet 150 where the conveying rolls 131 and 141 are disposed (i.e., an upper side of the sheet in FIG. 1). This is because it is necessary to dispose a mechanism to drive the conveying rolls 132 and 142 on the lower side of the sheet, and not necessary to dispose it on the upper side of the sheet, and hence there is a free space at the upper side of the sheet, compared to the lower side of the sheet.

(Explanation of an Example of the Construction of an Image Forming Apparatus)

Figure 2:
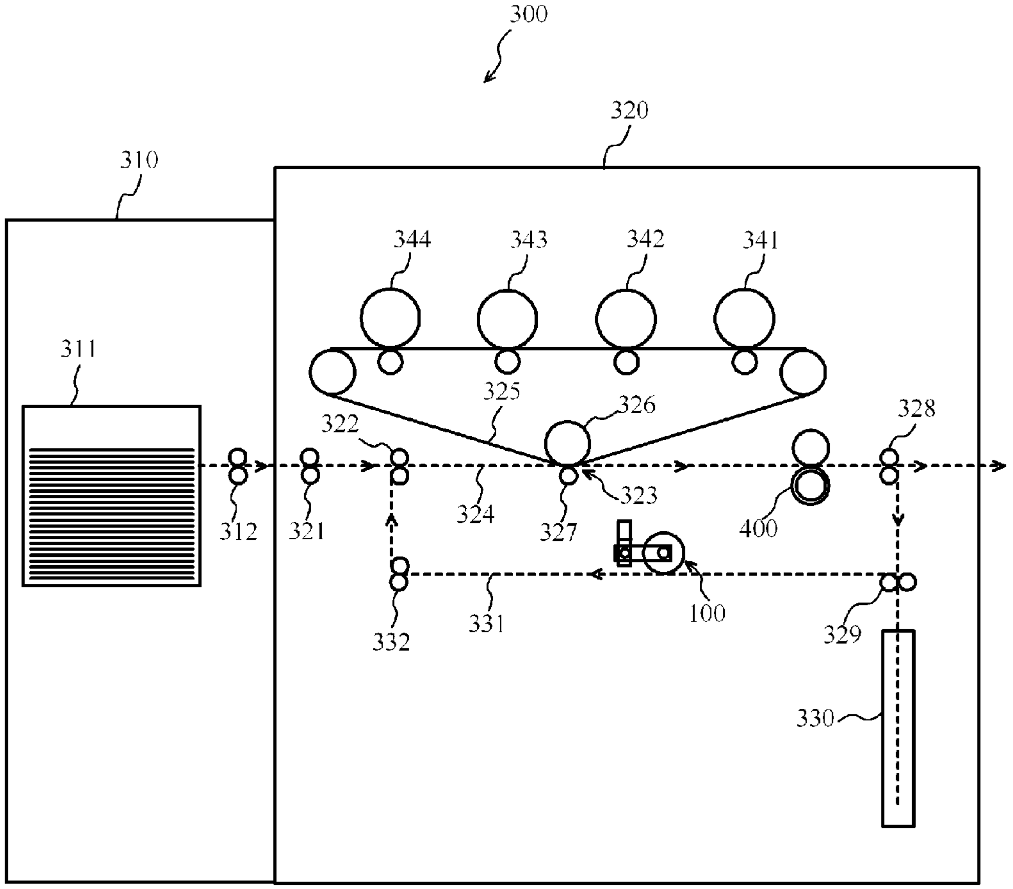
FIG. 2 is a diagram showing an example of a construction of an image forming apparatus.

FIG. 2 shows an example of an image forming apparatus 300 including the length measurement apparatus 100. The image forming apparatus 300 includes a sheet feeding unit 310 feeding the sheet 150, an image forming unit 320 forming an image on the sheet 150, and a fixing unit 400 fixing the formed image on the sheet 150.

(Explanation of an Example of the Construction of the Sheet Feeding Unit)

The sheet feeding unit 310 includes a storage device 311 that stores plural sheets, a feeding mechanism (not shown) that feeds a sheet from the storage device 311 in the conveying direction (i.e., a direction of the image forming unit 320), conveying rolls 312 that convey the sheet fed from the feeding mechanism to the image forming unit 320.

(Explanation of an Example of the Construction of the Image Forming Unit)

The image forming unit 320 includes conveying rolls 321 that convey the sheet fed from the sheet feeding unit 310 into the image forming unit 320. Conveying rolls 322, which convey the sheet 150 fed from the conveying rolls 321 or conveying rolls 332 described later toward a secondary transfer unit 323 on a conveying path 324, are disposed at the downstream side of the conveying rolls 321. The secondary transfer unit 323 includes a transfer roll 326 and an opposed roll 327, transfers a toner image formed on a transfer belt 325 onto the sheet 150 by nipping the transfer belt 325 and the sheet 150 between the transfer roll 326 and the opposed roll 327.

A fixing unit 400 having a function that fixes the toner image on the sheet 150 to the sheet 150 by heating and pressurizing, is disposed at the downstream side of the secondary transfer unit 323. Conveying rolls 328 convey the sheet 150 fed from the fixing unit 400 to the outside of the image forming unit 320 or conveying rolls 329.

When images are formed on both surfaces (i.e., first and second surfaces) of the sheet 150, the conveying rolls 328 convey the sheet 150 in a direction of the conveying rolls 329 at the stage where the formation of the image to the first surface of the sheet 150 is terminated. The sheet 150 is temporarily transferred to an inversion device 330 by the conveying rolls 329. The inversion device 330 sends back the conveyed sheet 150 toward the conveying rolls 329. The conveying rolls 329 convey the sheet 150 discharged from the inversion device 330 to a conveying path 331.

The length measurement apparatus 100 shown in FIG. 1 is disposed on the conveying path 331. The length measurement apparatus 100 measures the length of the sheet 150 conveyed on the conveying path 331 in the conveying direction. The result of the measurement of the length measurement apparatus 100 is transmitted to the controller 200 shown in FIG. 1. Then, the sheet 150 is conveyed to the conveying path 324 by the conveying rolls 332 and 322. At this time, both surfaces of the sheet 150 are reversed, compared to the case where the sheet 150 is first conveyed on the conveying path 324. The sheet 150 reconveyed on the conveying path 324 is conveyed to the secondary transfer unit 323 again, and the image is transferred onto the second surface which is back of the first surface of the sheet 150.

The control of a primary transfer process and a secondary transfer process of the image formed on the second surface is executed based on information on the length of the sheet in the conveying direction, measured with the length measurement apparatus 100. This is because the change of the size of the sheet occurs by an influence of the image formed on the first surface, and if an image formation position is not adjusted, a misalignment of the image formation position on the second surface is caused.

The image forming unit 320 includes primary transfer units 341 to 344. Each of the primary transfer units 341 to 344 includes a photosensitive drum, a cleaning device, an electrifier, an exposure device, a developing device, and transfer rolls. The primary transfer units 341 to 344 superimpose toner images of Y (Yellow), M (Magenta), C (Cyan), and K (Black) on the rotating transfer belt 325, and transfer the toner images onto the rotating transfer belt 325. Thereby, color toner images in which the toner images of the YMCK are superimposed mutually, are formed on the transfer belt 325.

The operation of each component described above is controlled with the controller 200. The controller 200 controls each element of the length measurement apparatus 100 shown in FIG. 1 to measure the sheet length. At the time of the image forming process to the second surface when the images are formed on both surfaces of the sheet, the controller 200 controls the image forming process based on the measured sheet length.

In the construction shown in FIG. 2, the length measurement apparatus 100 may be disposed on the upstream of the secondary transfer unit 323 on the conveying path 324, and measure the sheet length in the conveying direction at a stage before the image formation regardless of any one of the surfaces of the sheet, and hence information on the result of the measurement may be used for the image formation.

(Explanation of an Example of the Construction of a Control System)

Next, a description will be given of a control system of the image forming apparatus 300 illustrated in FIG. 2.

Figure 3:
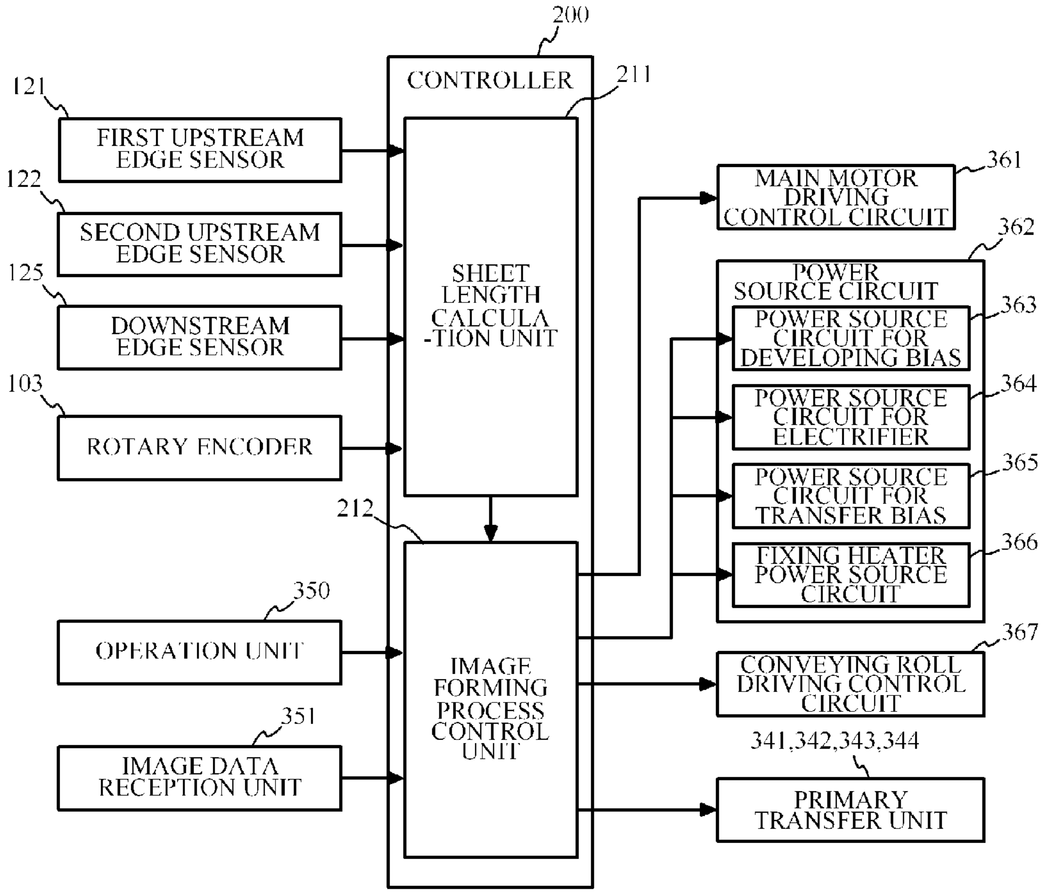
FIG. 3 is a diagram showing an example of the connection of a controller in the image forming apparatus.

First, a description will be given of an example of the connection construction of the controller 200, with reference to FIG. 3. An operation unit 350, an image data reception unit 351, the first upstream edge sensor 121, the second upstream edge sensor 122, the first downstream edge sensor 125, the rotary encoder 103, and so on are connected to an input unit (i.e., an input and output unit 204 shown in FIG. 4) of the controller 200. A main motor driving control circuit 361, a power source circuit 362, a conveying roll driving control circuit 367, the primary transfer units 341 to 344, and so on are connected to an output unit (i.e., the input and output unit 204 shown in FIG. 4) of the controller 200.

The operation unit 350 receives operation information input by a user. The operation unit 350 outputs the received operation information to the controller 200. The operation information includes settings of one-sided print, double-sided print, the number of print copies, and so on.

The image data reception unit 351 functions as an input unit that receives image data transmitted to the image forming apparatus 300 via a communication line (e.g. Local Area Network), not shown. The image data reception unit 351 outputs the received image data to the controller 200.

Each of the first upstream edge sensor 121, the second upstream edge sensor 122 and the downstream edge sensor 125 detects the sheet 150 conveyed on the conveying path, and outputs a sensor signal indicative of "ON" while the sheet 150 being detected, to the controller 200. When the length measurement roll 101 rotates, the rotary encoder 103 generates a pulse signal for each given rotation angle of the length measurement roll 101. The pulse signal generated with the rotary encoder 103 is also output to the controller 200.

Next, a description will be given of devices executing processes relating to the image formation. The operation of the devices is controlled with the controller 200.

The main motor driving control circuit 361 controls a motor rotating the transfer belt 325 in FIG. 2.

The power source circuit 362 includes a power source circuit for developing bias 363, a power source circuit for electrifier 364, a power source circuit for transfer bias 365, and a fixing heater power source circuit 366. The power source circuit for developing bias 363 generates a bias voltage supplied to the developing device when the toner in the developing device is supplied to the photosensitive drum of each of the primary transfer units 341 to 344 in FIG. 2. The power source circuit for electrifier 364 electrifies the photosensitive drum of each of the primary transfer units 341 to 344. The power source circuit for transfer bias 365 generates a bias voltage applied to each of the primary transfer units 341 to 344 at the time of the primary transfer to the transfer belt 325, and a bias voltage supplied to the transfer roll 326 at the time of the secondary transfer in the secondary transfer unit 323.

The fixing heater power source circuit 366 supplies a power source to a heater included in the fixing unit 400.

A conveying roll driving control circuit 367 drives a motor rotating the rolls of a conveying mechanism for conveying the sheet, such as the conveying rolls 322.

Figure 4:
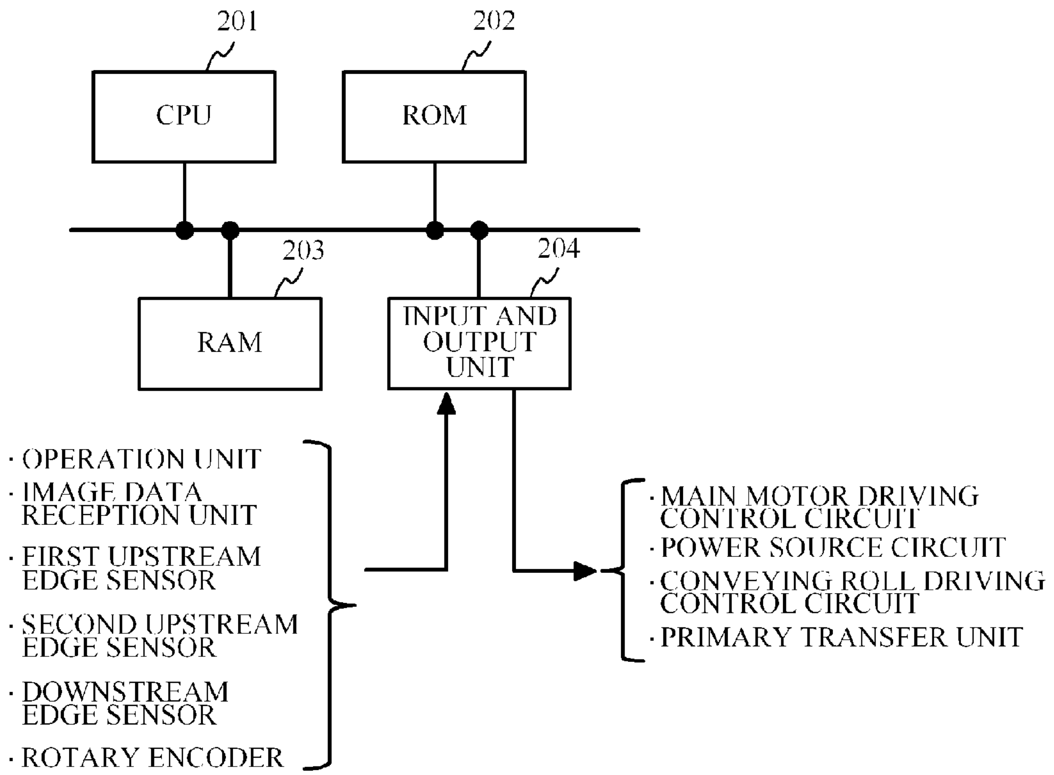
FIG. 4 is a diagram showing an example of a hardware construction of the controller.

Next, a description will be given of the hardware construction of the controller 200, with reference to FIG. 4. FIG. 4 shows an example of the hardware construction of the controller 200. The controller 200 includes a CPU (Central Processing Unit) 201, a ROM (Read Only Memory) 202, a RAM (Random Access Memory) 203, and the input and output unit 204. A program which the CPU 201 uses for the control is stored into the ROM 202. The CPU 201 reads out the program stored into the ROM 202, and stores the read-out program into the RAM 203. Then, the CPU 201 executes the process according to the program stored into the RAM 203. The RAM 203 is used as a working area storing data that the CPU 201 uses for calculation, data on the result of the calculation, and so on. The RAM 203 stores information on a standardized size of the sheet 150 accommodated in plural feeding trays included in the storage device 311. The RAM 203 stores the number of sheets 150 accommodated in each feeding tray, and the information on the standardized size of the sheet 150. The input and output unit 204 inputs data output from the operation unit 350, the image data reception unit 351, the first upstream edge sensor 121, the second upstream edge sensor 122, the downstream edge sensor 125, the rotary encoder 103, and so on, as shown in FIG. 3. The input and output unit 204 also outputs control signals generated with the CPU 201 to the main motor driving control circuit 361, the power source circuit 362, the conveying roll driving control circuit 367, and the primary transfer units 341 to 344.

Next, a description will be given of functional blocks of the controller 200 achieved by program control, with reference to FIG. 3. The controller 200 includes a sheet length calculation unit 211, and an image forming process control unit 212 as functional blocks. These functional blocks are achieved by the cooperation of the program stored into the ROM 202, and the hardware such as the CPU 201 and the RAM 203.

The sheet length calculation unit 211 has a calculating function that calculates the sheet length, and stores data to be processed by the calculating function into the RAM 203. The RAM 203 stores data on a rotational amount of the length measurement roll 101, data on the size of the length measurement roll 101, information acquired from the sensor signals output from the first upstream edge sensor 121, the second upstream edge sensor 122 and the downstream edge sensor 125 (i.e., information on ON/OFF of the three sensors). The RAM 203 stores information on a distance between the first upstream edge sensor 121 and the downstream edge sensor 125, information on a distance between the second upstream edge sensor 122 and the downstream edge sensor 125, and so on.

The image forming process control unit 212 controls the processes relating to the image formation. The main motor driving control circuit 361, the power source circuit 362, the conveying roll driving control circuit 367, and the primary transfer units 341 to 344 are included in controlled objects of the image forming process control unit 212.

(Explanation of Calculating Procedures of Sheet Length by Controller)

Figure 5:
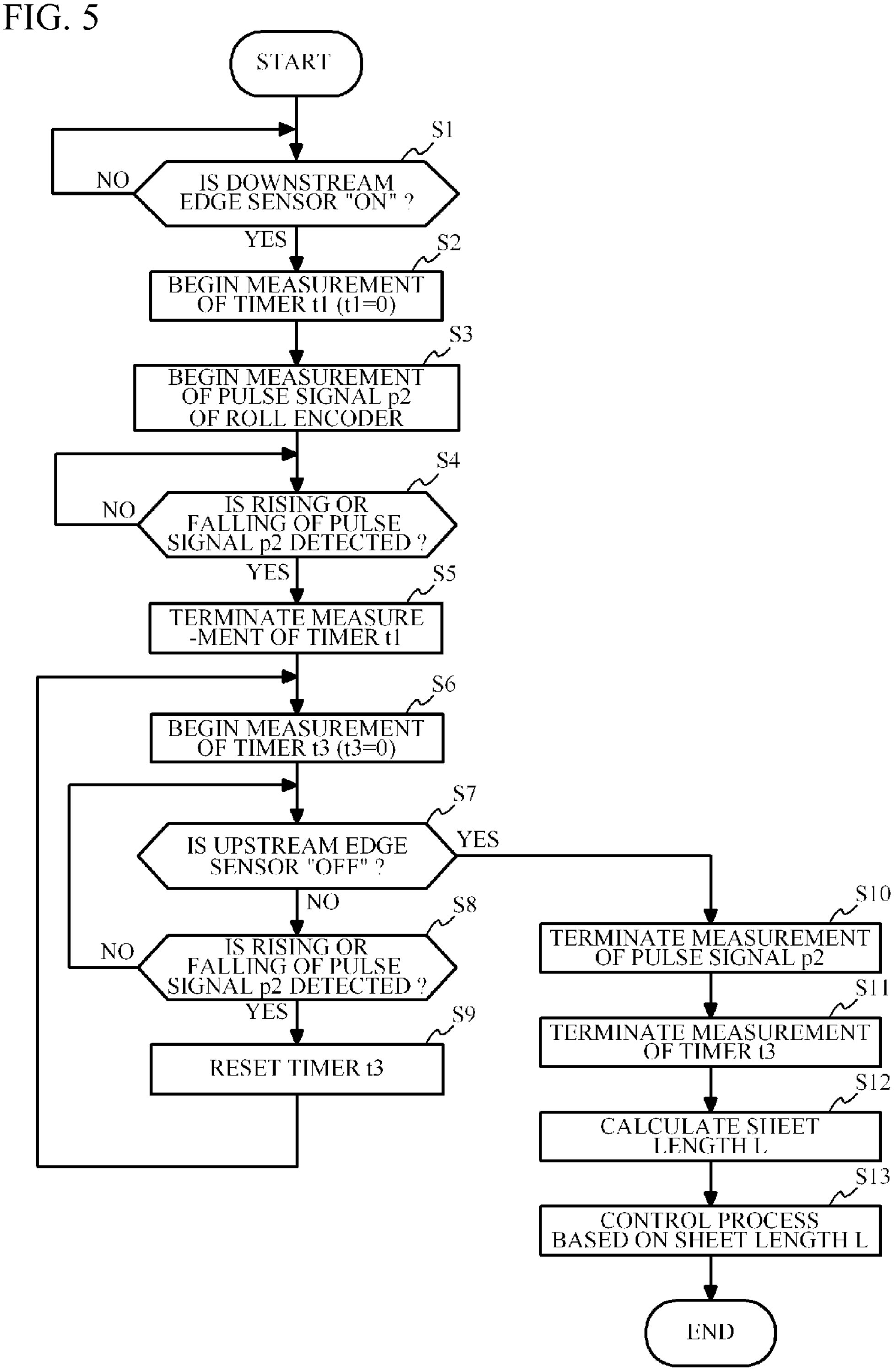
FIG. 5 is a flowchart showing an example of measurement procedures of the sheet length with the controller.

Next, a description will be given of an example of control operation of the controller 200, with reference to a flowchart shown in FIG. 5. The algorithm shown in FIG. 5 is stored into the RAM 202 as a control program, and is executed by the CPU 201. Here, a description will be given of an example of a calculating process of the sheet length executed before the image formation to the second surface when the images are formed on both surfaces of the sheet 150. Further, a description will be given of an example of a case where a detection period calculating the sheet length based on the pulse signal p2 output from the rotary encoder 103 is prescribed based on the sensor signals of the first upstream edge sensor 121 and the downstream edge sensor 125. Details of the detection period will be described later.

When the images are formed on both surfaces of the sheet 150, the sheet is switched back at the inversion device 330, and conveyed to the conveying path 331 after the image formation to the first surface is executed. At this timing, a process shown in FIG. 5 is started.

Figure 6A:
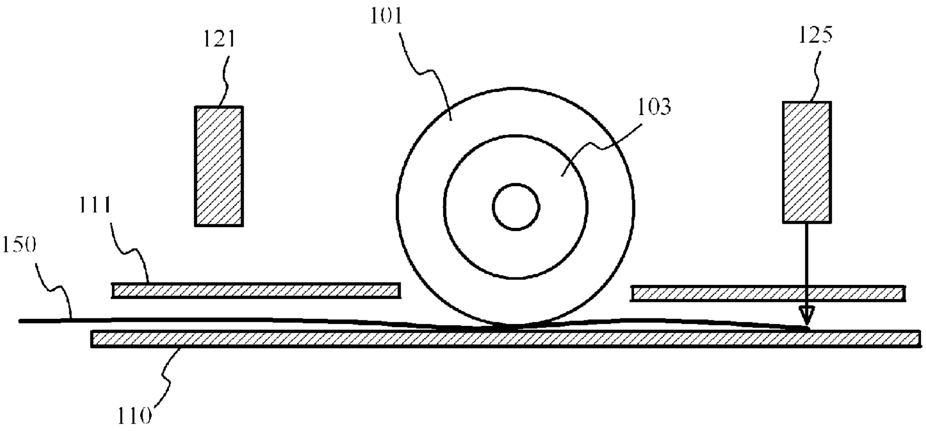
FIGS. 6A and 6B are diagrams useful in explaining a calculating method of the sheet length with the controller when a front edge of the sheet reaches a downstream edge sensor and when a rear edge of the sheet comes out of an upstream edge sensor, respectively.

The controller 200 first judges whether the sensor signal of the downstream edge sensor 125 is "ON" (step S1). When the sensor signal of the downstream edge sensor 125 is "ON" (YES in step S1), the controller 200 proceeds to step S2. When the sensor signal of the downstream edge sensor 125 is not "ON" (NO in step S1), the controller 200 repeatedly executes the procedure of step S1. The sensor signal of the downstream edge sensor 125 showing "ON" indicates a state where the front edge of the sheet 150 has reached a detection position of the downstream edge sensor 125 (see FIG. 6A).

When the downstream edge sensor 125 detects the sheet 150 (YES in step S1), the controller 200 begins the measurement of the timer t1 (step S2). The controller 200 begins the measurement of a pulse signal p2 output from the rotary encoder 103 in time with the beginning of the measurement of the timer t1 (step S3). Then, when the controller 200 detects the change of a signal level of the pulse signal p2 (step S4), the controller 200 terminates the measurement of the timer t1 (step S5). At this time, the controller 200 acquires a count value of the timer t1 as a measurement parameter t1, and stores the measurement parameter t1 into the RAM 203.

Figure 6B:
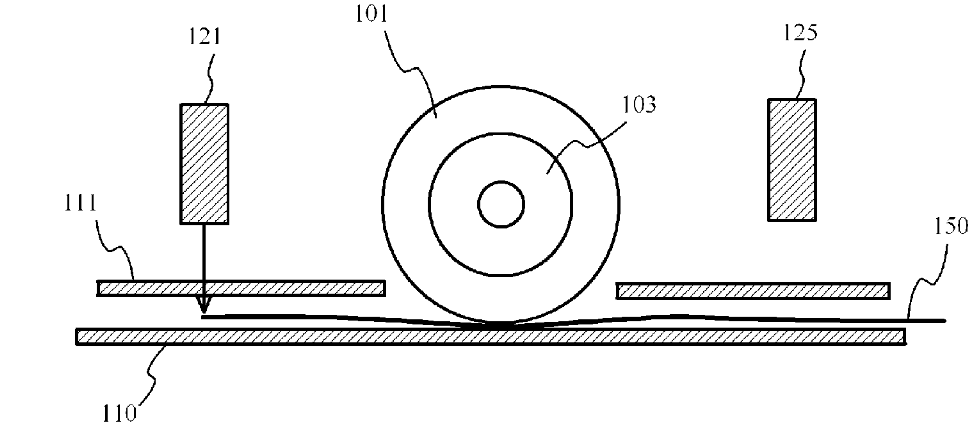

Next, the controller 200 begins the measurement of the timer t3 from a state of "t3=0" (step S6), and judges whether the sensor signal output from the first upstream edge sensor 121 is "OFF" (step S7). A state where the sensor signal output from the first upstream edge sensor 121 is "OFF" indicates that the sheet 150 has passed through the detection position of the first upstream edge sensor 121, as shown in FIG. 6B. When the sensor signal output from the first upstream edge sensor 121 is "OFF" (YES in step S7), the controller 200 terminates the measurement of the pulse signal p2 (step S10). In addition, the controller 200 terminates the measurement of the timer t3 (step S11). At this time, the controller 200 acquires a count value of the timer t3 as a measurement parameter t3, and stores the measurement parameter t3 into the RAM 203.

On the other hand, when the sensor signal output from the first upstream edge sensor 121 is not "OFF" (NO in step S7), the controller 200 judges whether the change of the signal level of the pulse signal p2 is detected (step S8). When the change of the signal level of the pulse signal p2 is detected (YES in step S8), the controller 200 resets the timer t3 (step S9), returns to step S6, and begins the measurement of the timer t3 again. When the change of the signal level of the pulse signal p2 is not detected (NO in step S8), the controller 200 repeatedly executes the judgment of step S7.

After step S11, the controller 200 calculates a sheet length L (step S12). The controller 200 calculates the sheet length L by totaling the values of sheet lengths L1 to L4 described later. The controller 200 adjusts a position of the image formed on the second surface of the sheet 150, based on the calculated sheet length L (step S13).

Here, a description will be given of the sheet lengths L1 to L4, with reference to FIGS. 6A to 8. Further, a description will be given of an example of a case where a detection period calculating the sheet length based on the pulse signal p2 output from the rotary encoder 103 is prescribed based on the sensor signals of the first upstream edge sensor 121 and the downstream edge sensor 125.

First, the sheet length L2 will be described. The sheet length L2 is a sheet length which the controller 200 calculates based on the number of the counted pulse signals p2 output from the rotary encoder 103 while both of the first upstream edge sensor 121 and the downstream edge sensor 125 are detecting the sheet 150 (hereinafter referred to as "a first measurement period"). That is, the measurement beginning timing of the first measurement period is timing when the front edge of the sheet 150 reaches the detection position of the downstream edge sensor 125, and the sensor signal of the downstream edge sensor 125 becomes "ON" (see FIG. 6A). The measurement finish timing of the first measurement period is timing when the rear edge of the sheet 150 comes free from the detection position of the first upstream edge sensor 121, and the sensor signal of the first upstream edge sensor 121 becomes "OFF" (see FIG. 6B). The controller 200 calculates the sheet length L2 from the number of the counted pulse signals p2 for the first measurement period.

The sheet length L4 is a distance between the first upstream edge sensor 121 and the downstream edge sensor 125. As described above, the measurement of the sheet length by using the length measurement roll 101 is executed after the front edge of the sheet 150 reaches the detection position of the downstream edge sensor 125. Also, the measurement of the sheet length is not executed after the rear edge of the sheet 150 comes free from the detection position of the first upstream edge sensor 121. Thereby, it is necessary to add to the sheet lengths L2 and L4 a distance from the measurement position of the rotary encoder 103 to the downstream edge sensor 125 before the measurement by the rotary encoder 103, and a distance from the first upstream edge sensor 121 to the measurement position of the rotary encoder 103 after the measurement by the rotary encoder 103.

Figures 7A, 7B, 7C:
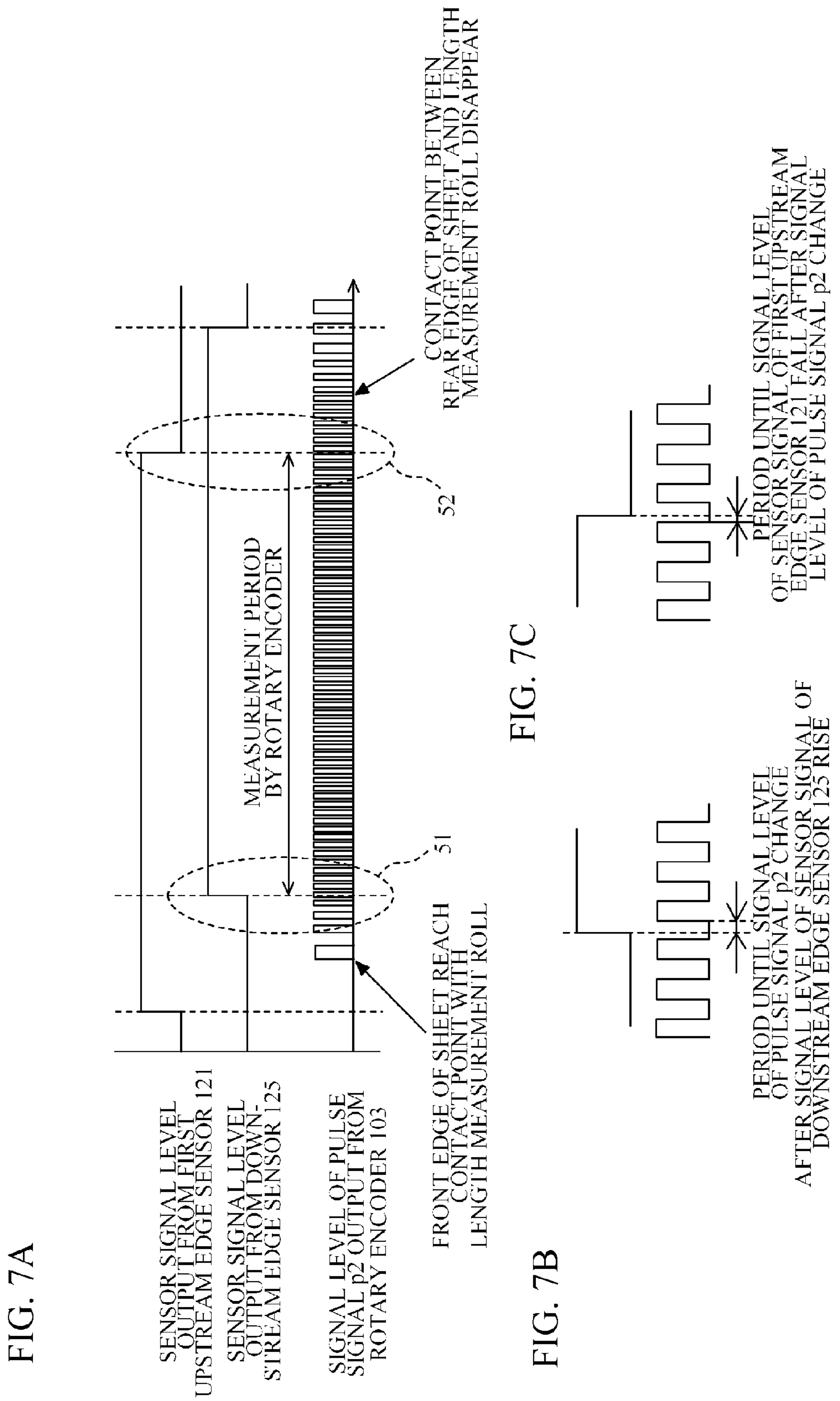

The sheet lengths L1 and L3 are values for correcting measurement errors by the rotary encoder 103. A description will be given of the measurement error, with reference to FIGS. 7A to 7C. FIG. 7A shows a signal waveform of the pulse signal p2 output from the rotary encoder 103, a signal level of the sensor signal of the first upstream edge sensor 121, and a signal level of the sensor signal of the downstream edge sensor 125.

FIG. 7B is an enlarged view of an area 50 in FIG. 7A, and FIG. 7C is an enlarged view of an area 51 in FIG. 7A. FIG. 7B shows the pulse signal p2 and the sensor signal of the downstream edge sensor 125 in the vicinity where the sensor signal of the downstream edge sensor 125 becomes "ON". Similarly, FIG. 7C shows the pulse signal p2 and the sensor signal of the first upstream edge sensor 121 in the vicinity where the sensor signal of the first upstream edge sensor 121 becomes "OFF".

As shown in FIGS. 7A and 7B, there is a misalignment between timing when the front edge of the sheet 150 reaches the detection position of the downstream edge sensor 125 and the sensor signal of the downstream edge sensor 125 becomes "ON", and timing when the signal level of the pulse signal p2 output from the rotary encoder 103 changes (i.e., the signal level of the pulse signal p2 rises). The misalignment occurs due to the resolution of the rotary encoder 103. A period between the timing when the sensor signal of the downstream edge sensor 125 becomes "ON", and the timing when the signal level of the pulse signal p2 changes is a measurement value of the timer t1, described above. The controller 200 calculates the sheet length L1 based on the measurement value of the timer t1 and the conveying speed of the sheet 150.

Similarly, as shown in FIGS. 7A and 7C, there is a misalignment between timing when the signal level of the pulse signal p2 output from the rotary encoder 103 changes (i.e., the signal level of the pulse signal p2 falls), and timing when the rear edge of the sheet 150 comes free from the detection position of the first upstream edge sensor 121 and the sensor signal of the first upstream edge sensor 121 becomes "OFF". A period between the timing when the signal level of the pulse signal p2 output from the rotary encoder 103 changes and the timing when the sensor signal of the first upstream edge sensor 121 becomes "OFF" is a measurement value of the timer t3, described above. The controller 200 calculates the sheet length L3 based on the measurement value of the timer t3 and the conveying speed of the sheet 150.

Figure 8:
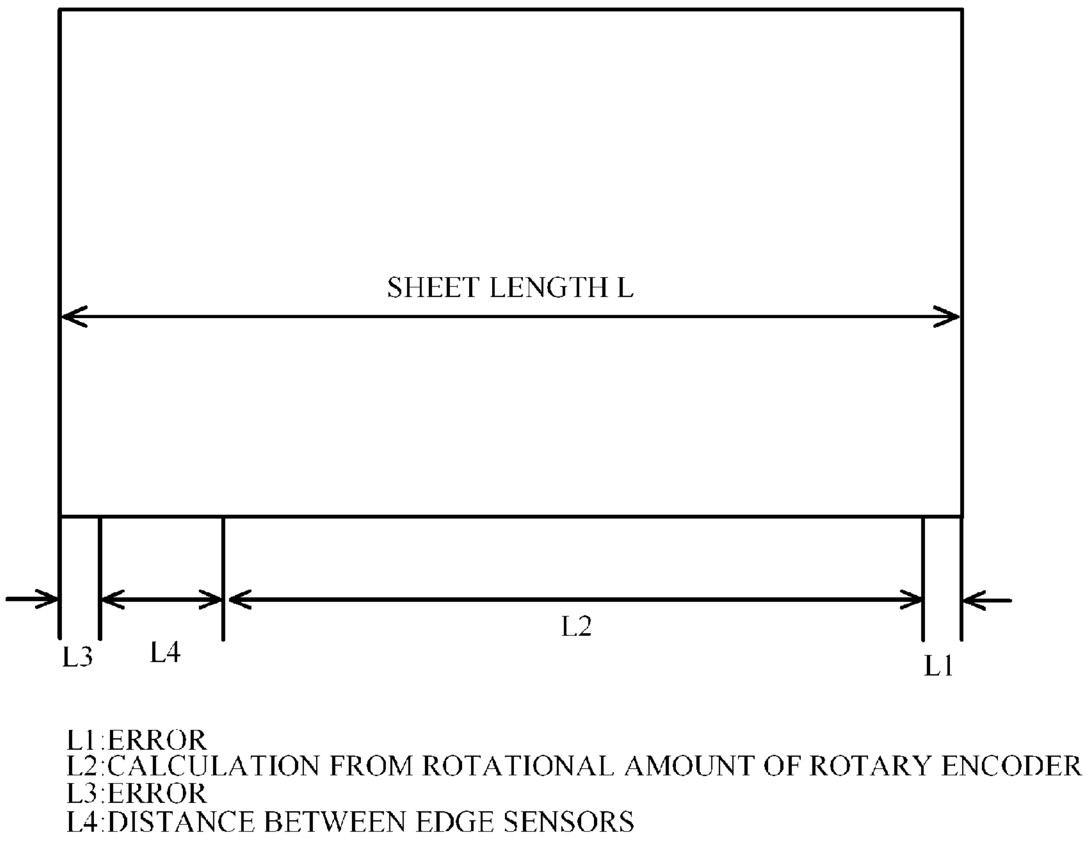
FIG. 8 is a diagram useful in explaining the calculating method of the sheet length with the controller.

The controller 200 first calculates the sheet length L2 based on the number of counted pulse signals p2 for the first detection period. Also, the controller 200 calculates the sheet length L1 by multiplying the measurement value of the timer t1 by a setting value V of the conveying speed of the sheet 150. Similarly, the controller 200 calculates the sheet length L3 by multiplying the measurement value of the timer t3 by the setting value V of the conveying speed of the sheet 150. Then, the controller 200 calculates the sheet length L by adding the value of the distance between the first upstream edge sensor 121 and the downstream edge sensor 125 stored into the RAM 203 to a value to which the calculated sheet lengths L1 to L3 are added up. FIG. 8 shows a state where the sheet length L is calculated by adding up the sheet lengths L1 to L4.

The controller 200 calculates the sheet length L2 for a second detection period in a manner similar to the first detection period. The second detection period is a period in which the second upstream edge sensor 122 and the downstream edge sensor 125 detect the sheet 150. Then, the controller 200 calculates the sheet length L by adding the value of the distance between the second upstream edge sensor 122 and the downstream edge sensor 125 stored into the RAM 203 to a value to which the calculated sheet lengths L1 to L3 are added up.

As described above, the controller 200 measures the sheet length L2 based on the number of counted pulse signals p2 output from the rotary encoder 103, for the first detection period in which the first upstream edge sensor 121 and the downstream edge sensor 125 detect the sheet 150. The measured sheet length L2 will hereinafter be referred to as "LF1". Further, the controller 200 measures the sheet length L2 based on the number of counted pulse signals p2 output from the rotary encoder 103, for the second detection period in which the second upstream edge sensor 122 and the downstream edge sensor 125 detect the sheet 150. The measured sheet length L2 will hereinafter be referred to as "LF2". The controller 200 selects one of the sheet length LF1 measured for the first detection period and the sheet length LF2 measured for the second detection period, and calculates the whole sheet length L by using the selected the sheet length LF1 or LF2 as the sheet length L2. A description will be given of a reason to execute such a process, and a standard for selecting the sheet length L2.

Figure 9A:
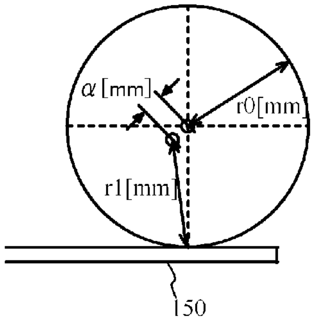
FIG. 9A is a diagram useful in explaining an eccentric error of a length measurement roll.

If an eccentricity exists in the length measurement roll 101, the sheet length L2 to be calculated based on the pulse signal p2 output from the rotary encoder 103 cannot be measured with high accuracy. That is, if the center of rotation shifts from the center position of the length measurement roll 101 even a little, an error occurs in the measurement of sheet length L2 by the differences of the radius of rotation of the length measurement roll 101. FIG. 9A shows a state where the center of rotation shifts from the center position of the length measurement roll 101 by α [mm]. Also, FIG. 9A shows that there is a part where the radius of rotation of the length measurement roll 101 becomes r1 [mm] from r0[mm] (r0>r1) when the center of rotation shifts from the center position of the length measurement roll 101 by α[mm].

To accurately calculate the sheet length L2 from the rotational amount of the length measurement roll 101 without receiving an influence of the eccentricity of the length measurement roll 101, the sheet length L2 to be measured with the length measurement roll 101 only has to be integral multiples of the circumference length of the length measurement roll 101. This is because the circumference length of the length measurement roll 101 is calculated by multiplying a diameter of the length measurement roll 101 by π (circular constant).

Next, a description will be given of a relationship between a phase difference between phases at the start time and the end time of the measurement by the length measurement roll 101, and a measurement error included in the sheet length L2 measured with the length measurement roll 101.

Figure 10:
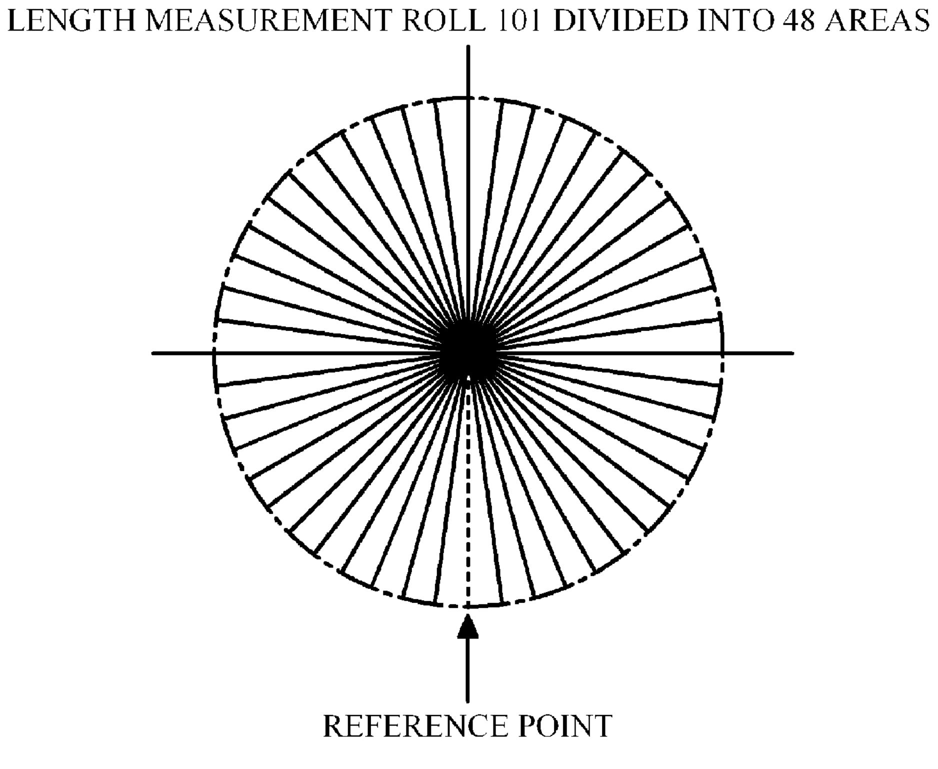
FIG. 10 is a diagram showing a state where the length measurement roll is divided into 48 areas.

The controller 200 sets any position on the circumference of the length measurement roll 101 to a reference point in advance, divides the circumference (one circumference=one period=2π) of the length measurement roll 101 into 48 areas from the reference point as a start point (see FIG. 10). It should be noted that the number of divisions may be arbitrary, and to improve the accuracy of calculation, the number of divisions may be further increased. The controller 200 measures the sheet length L2 from the pulse signal p2 while changing a phase (or a rotational angle) from the reference point by 1/48 of the circumference. The 1/48 of the circumference indicates a single area in the 48 areas into which a phase difference between a phase of a measurement start position (i.e., a rotational angle from the reference point) of the length measurement roll 101 and a phase of a measurement end position (i.e., a rotational angle from the reference point) is divided. Then, the controller 200 calculates a measurement error between the measured sheet length L2 and the actual sheet length L2. The controller 200 calculates the actual sheet length L2 for calculating the measurement error included in the measured sheet length L2, by subtracting the values of the above-mentioned sheet lengths L1, L3, and L4 from the calculated sheet length L1 beforehand. A table 1 shows a table that classifies the calculated measurement errors by phases at the start time and the end time of the measurement by the length measurement roll 101. A line in the table 1 shows the phase at the start time of the measurement by the length measurement roll 101, which is changed from 0 to 2π (1 rotation) by the 1/48 of the circumference. A row in the table 1 shows the phase at the end time of the measurement by the length measurement roll 101, which is changed from 0 to 2π (1 rotation) by the 1/48 of the circumference.

The phase of the measurement start position shows the rotational angle from the reference point of the length measurement roll 101 when the downstream edge sensor 125 has detected the front edge of the sheet. The phase of the measurement end position shows the rotational angle from the reference point of the length measurement roll 101 when the first upstream edge sensor 121 or the second upstream edge sensor 122 could not detect the rear edge of the sheet.

TABLE 1

| | | | PHASE OF LENGTH MEASUREMENT ROLL AT END TIME OF MEASUREMENT | | | | | | | | | | | | | | | |
|---|---|---|---|---|---|---|---|---|---|---|---|---|---|---|---|---|---|
| | No | rad | 0 | 1 | 2 | 3 | 4 | 5 | 6 | 7 | 8 | 9 | 10 | 11 | 12 | 13 | 14 | 15 |
| PHASE OF | 1 | 0.1309 | 0.13 | 0 | −0.1 | −0.3 | −0.4 | −0.5 | −0.6 | −0.7 | −0.8 | −0.9 | −0.9 | −1 | −1 | −1 | −1 | −1 |
| LENGTH | 2 | 0.2618 | 0.26 | 13 | 0 | −0.1 | −0.3 | −0.4 | −0.5 | −0.6 | −0.7 | −0.8 | −0.9 | −0.9 | −1 | −1 | −1 | −1 |
| MEASURE- | 3 | 0.3927 | 0.38 | 0.26 | 0.13 | 0 | −0.1 | −0.3 | −0.4 | −0.5 | −0.6 | −0.7 | −0.8 | −0.9 | −0.9 | −1 | −1 | −1 |
| MENT | 4 | 0.5236 | 0.5 | 0.38 | 0.26 | 0.13 | 0 | −0.1 | −0.3 | −0.4 | −0.5 | −0.6 | −0.7 | −0.8 | −0.9 | −0.9 | −1 | −1 |
| ROLL AT | 5 | 0.6545 | 0.61 | 0.5 | 0.38 | 0.26 | 0.13 | 0 | −0.1 | −0.3 | −0.4 | −0.5 | −0.6 | −0.7 | −0.8 | −0.9 | −0.9 | −1 |
| START | 6 | 0.7854 | 0.71 | 0.61 | 0.5 | 0.38 | 0.26 | 0.13 | 0 | −0.1 | −0.3 | −0.4 | −0.5 | −0.6 | −0.7 | −0.8 | −0.9 | −0.9 |
| TIME OF | 7 | 0.9163 | 0.79 | 0.71 | 0.61 | 0.5 | 0.38 | 0.26 | 0.13 | 0 | −0.1 | −0.3 | −0.4 | −0.5 | −0.6 | −0.7 | −0.8 | −0.9 |
| MEASURE- | 8 | 1.0472 | 0.87 | 0.79 | 0.71 | 0.61 | 0.5 | 0.38 | 0.26 | 0.13 | 0 | −0.1 | −0.3 | −0.4 | −0.5 | −0.6 | −0.7 | −0.8 |
| MENT | 9 | 1.1781 | 0.92 | 0.87 | 0.79 | 0.71 | 0.61 | 0.5 | 0.38 | 0.26 | 0.13 | 0 | −0.1 | −0.3 | −0.4 | −0.5 | −0.6 | −0.7 |
| | 10 | 1.309 | 0.97 | 0.92 | 0.87 | 0.79 | 0.71 | 0.61 | 0.5 | 0.38 | 0.26 | 0.13 | 0 | −0.1 | −0.3 | −0.4 | −0.5 | −0.6 |
| | 11 | 1.4399 | 0.99 | 0.97 | 0.92 | 0.87 | 0.79 | 0.71 | 0.61 | 0.5 | 0.38 | 0.26 | 0.13 | 0 | −0.1 | −0.3 | −0.4 | −0.5 |
| | 12 | 1.5708 | 1 | 0.99 | 0.97 | 0.92 | 0.87 | 0.79 | 0.71 | 0.61 | 0.5 | 0.38 | 0.26 | 0.13 | 0 | −0.1 | −0.3 | −0.4 |
| | 13 | 1.7017 | 0.99 | 1 | 0.99 | 0.97 | 0.92 | 0.87 | 0.79 | 0.71 | 0.61 | 0.5 | 0.38 | 0.26 | 0.13 | 0 | −0.1 | −0.3 |
| | 14 | 1.8326 | 0.97 | 0.99 | 1 | 0.99 | 0.97 | 0.92 | 0.87 | 0.79 | 0.71 | 0.61 | 0.5 | 0.38 | 0.26 | 0.13 | 0 | −0.1 |
| | 15 | 1.9635 | 0.92 | 0.97 | 0.99 | 1 | 0.99 | 0.97 | 0.92 | 0.87 | 0.79 | 0.71 | 0.61 | 0.5 | 0.38 | 0.26 | 0.13 | 0 |
| | 16 | 2.0944 | 0.87 | 0.92 | 0.97 | 0.99 | 1 | 0.99 | 0.97 | 0.92 | 0.87 | 0.79 | 0.71 | 0.61 | 0.5 | 0.38 | 0.26 | 0.13 |
| | 17 | 2.2253 | 0.79 | 0.87 | 0.92 | 0.97 | 0.99 | 1 | 0.99 | 0.97 | 0.92 | 0.87 | 0.79 | 0.71 | 0.61 | 0.5 | 0.38 | 0.26 |
| | 18 | 2.3562 | 0.71 | 0.79 | 0.87 | 0.92 | 0.97 | 0.99 | 1 | 0.99 | 0.97 | 0.92 | 0.87 | 0.79 | 0.71 | 0.61 | 0.5 | 0.38 |
| | 19 | 2.4871 | 0.61 | 0.71 | 0.79 | 0.87 | 0.92 | 0.97 | 0.99 | 1 | 0.99 | 0.97 | 0.92 | 0.87 | 0.79 | 0.71 | 0.61 | 0.5 |
| | 20 | 2.618 | 0.5 | 0.61 | 0.71 | 0.79 | 0.87 | 0.92 | 0.97 | 0.99 | 1 | 0.99 | 0.97 | 0.92 | 0.87 | 0.79 | 0.71 | 0.61 |
| | 21 | 2.7489 | 0.38 | 0.5 | 0.61 | 0.71 | 0.79 | 0.87 | 0.92 | 0.97 | 0.99 | 1 | 0.99 | 0.97 | 0.92 | 0.87 | 0.79 | 0.71 |
| | 22 | 2.8798 | 0.26 | 0.38 | 0.5 | 0.61 | 0.71 | 0.79 | 0.87 | 0.92 | 0.97 | 0.99 | 1 | 0.99 | 0.97 | 0.92 | 0.87 | 0.79 |
| | 23 | 3.0107 | 0.13 | 0.26 | 0.38 | 0.5 | 0.61 | 0.71 | 0.79 | 0.87 | 0.92 | 0.97 | 0.99 | 1 | 0.99 | 0.97 | 0.92 | 0.87 |
| | 24 | 3.1416 | 0 | 0.13 | 0.26 | 0.38 | 0.5 | 0.61 | 0.71 | 0.79 | 0.87 | 0.92 | 0.97 | 0.99 | 1 | 0.99 | 0.97 | 0.92 |
| | 25 | 3.2725 | −0.1 | 0 | 0.13 | 0.26 | 0.38 | 0.5 | 0.61 | 0.71 | 0.79 | 0.87 | 0.92 | 0.97 | 0.99 | 1 | 0.99 | 0.97 |
| | 26 | 3.4034 | −0.3 | −0.1 | 0 | 0.13 | 0.26 | 0.38 | 0.5 | 0.61 | 0.71 | 0.79 | 0.87 | 0.92 | 0.97 | 0.99 | 1 | 0.99 |
| | 27 | 3.5343 | −0.4 | −0.3 | −0.1 | 0 | 0.13 | 0.26 | 0.38 | 0.5 | 0.61 | 0.71 | 0.79 | 0.87 | 0.92 | 0.97 | 0.99 | 1 |
| | 28 | 3.6652 | −0.5 | −0.4 | −0.3 | −0.1 | 0 | 0.13 | 0.26 | 0.38 | 0.5 | 0.61 | 0.71 | 0.79 | 0.87 | 0.92 | 0.97 | 0.99 |
| | 29 | 3.7961 | −0.6 | −0.5 | −0.4 | −0.3 | −0.1 | 0 | 0.13 | 0.26 | 0.38 | 0.5 | 0.61 | 0.71 | 0.79 | 0.87 | 0.92 | 0.97 |
| | 30 | 3.927 | −0.7 | −0.6 | −0.5 | −0.4 | −0.3 | −0.1 | 0 | 0.13 | 0.26 | 0.38 | 0.5 | 0.61 | 0.71 | 0.79 | 0.87 | 0.92 |
| | 31 | 4.0579 | −0.8 | −0.7 | −0.6 | −0.5 | −0.4 | −0.3 | −0.1 | 0 | 0.13 | 0.26 | 0.38 | 0.5 | 0.61 | 0.71 | 0.79 | 0.87 |
| | 32 | 4.1888 | −0.9 | −0.8 | −0.7 | −0.6 | −0.5 | −0.4 | −0.3 | −0.1 | 0 | 0.13 | 0.26 | 0.38 | 0.5 | 0.61 | 0.71 | 0.79 |
| | 33 | 4.3197 | −0.9 | −0.9 | −0.8 | −0.7 | −0.6 | −0.5 | −0.4 | −0.3 | −0.1 | 0 | 0.13 | 0.26 | 0.38 | 0.5 | 0.61 | 0.71 |
| | 34 | 4.4506 | −1 | −0.9 | −0.9 | −0.8 | −0.7 | −0.6 | −0.5 | −0.4 | −0.3 | −0.1 | 0 | 0.13 | 0.26 | 0.38 | 0.5 | 0.61 |
| | 35 | 4.5815 | −1 | −1 | −0.9 | −0.9 | −0.8 | −0.7 | −0.6 | −0.5 | −0.4 | −0.3 | −0.1 | 0 | 0.13 | 0.26 | 0.38 | 0.5 |
| | 36 | 4.7124 | −1 | −1 | −1 | −0.9 | −0.9 | −0.8 | −0.7 | −0.6 | −0.5 | −0.4 | −0.3 | −0.1 | 0 | 0.13 | 0.26 | 0.38 |
| | 37 | 4.8433 | −1 | −1 | −1 | −1 | −0.9 | −0.9 | −0.8 | −0.7 | −0.6 | −0.5 | −0.4 | −0.3 | −0.1 | 0 | 0.13 | 0.26 |
| | 38 | 4.9742 | −1 | −1 | −1 | −1 | −1 | −0.9 | −0.9 | −0.8 | −0.7 | −0.6 | −0.5 | −0.4 | −0.3 | −0.1 | 0 | 0.13 |

TABLE 1-continued

| | | PHASE OF LENGTH MEASUREMENT ROLL AT END TIME OF MEASUREMENT | | | | | | | | | | | | | | | |
|---|---|---|---|---|---|---|---|---|---|---|---|---|---|---|---|---|---|
| 39 | 5.1051 | −0.9 | −1 | −1 | −1 | −1 | −1 | −0.9 | −0.9 | −0.8 | −0.7 | −0.6 | −0.5 | −0.4 | −0.3 | −0.1 | 0 |
| 40 | 5.236 | −0.9 | −0.9 | −1 | −1 | −1 | −1 | −1 | −0.9 | −0.9 | −0.8 | −0.7 | −0.6 | −0.5 | −0.4 | −0.3 | −0.1 |
| 41 | 5.3669 | −0.8 | −0.9 | −0.9 | −1 | −1 | −1 | −1 | −1 | −0.9 | −0.9 | −0.8 | −0.7 | −0.6 | −0.5 | −0.4 | −0.3 |
| 42 | 5.4978 | −0.7 | −0.8 | −0.9 | −0.9 | −1 | −1 | −1 | −1 | −1 | −0.9 | −0.9 | −0.8 | −0.7 | −0.6 | −0.5 | −0.4 |
| 43 | 5.6287 | −0.6 | −0.7 | −0.8 | −0.9 | −0.9 | −1 | −1 | −1 | −1 | −1 | −0.9 | −0.9 | −0.8 | −0.7 | −0.6 | −0.5 |
| 44 | 5.7596 | −0.5 | −0.6 | −0.7 | −0.8 | −0.9 | −0.9 | −1 | −1 | −1 | −1 | −1 | −0.9 | −0.9 | −0.8 | −0.7 | −0.6 |
| 45 | 5.8905 | −0.4 | −0.5 | −0.6 | −0.7 | −0.8 | −0.9 | −0.9 | −1 | −1 | −1 | −1 | −1 | −0.9 | −0.9 | −0.8 | −0.7 |
| 46 | 6.0214 | −0.3 | −0.4 | −0.5 | −0.6 | −0.7 | −0.8 | −0.9 | −0.9 | −1 | −1 | −1 | −1 | −1 | −0.9 | −0.9 | −0.8 |
| 47 | 6.1523 | −0.1 | −0.3 | −0.4 | −0.5 | −0.6 | −0.7 | −0.8 | −0.9 | −0.9 | −1 | −1 | −1 | −1 | −1 | −0.9 | −0.9 |
| 48 | 6.2832 | −0 | −0.1 | −0.3 | −0.4 | −0.5 | −0.6 | −0.7 | −0.8 | −0.9 | −0.9 | −1 | −1 | −1 | −1 | −1 | −0.9 |

| | No | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|
| PHASE OF | 1 | −0.9 | −0.9 | −0.8 | −0.7 | −0.6 | −0.5 | −0.4 | −0.3 | −0.1 | −0 | 0.13 | 0.26 | 0.38 | 0.5 | 0.61 | 0.71 |
| LENGTH | 2 | −1 | −0.9 | −0.9 | −0.8 | −0.7 | −0.6 | −0.5 | −0.4 | −0.3 | −0.1 | −0 | 0.13 | 0.26 | 0.38 | 0.5 | 0.61 |
| MEASURE- | 3 | −1 | −1 | −0.9 | −0.9 | −0.8 | −0.7 | −0.6 | −0.5 | −0.4 | −0.3 | −0.1 | −0 | 0.13 | 0.26 | 0.38 | 0.5 |
| MENT | 4 | −1 | −1 | −1 | −0.9 | −0.9 | −0.8 | −0.7 | −0.6 | −0.5 | −0.4 | −0.3 | −0.1 | −0 | 0.13 | 0.26 | 0.38 |
| ROLL AT | 5 | −1 | −1 | −1 | −1 | −0.9 | −0.9 | −0.8 | −0.7 | −0.6 | −0.5 | −0.4 | −0.3 | −0.1 | −0 | 0.13 | 0.26 |
| START | 6 | −1 | −1 | −1 | −1 | −1 | −0.9 | −0.9 | −0.8 | −0.7 | −0.6 | −0.5 | −0.4 | −0.3 | −0.1 | −0 | 0.13 |
| TIME OF | 7 | −0.9 | −1 | −1 | −1 | −1 | −1 | −0.9 | −0.9 | −0.8 | −0.7 | −0.6 | −0.5 | −0.4 | −0.3 | −0.1 | −0 |
| MEASURE- | 8 | −0.9 | −0.9 | −1 | −1 | −1 | −1 | −1 | −0.9 | −0.9 | −0.8 | −0.7 | −0.6 | −0.5 | −0.4 | −0.3 | −0.1 |
| MENT | 9 | −0.8 | −0.9 | −0.9 | −1 | −1 | −1 | −1 | −1 | −0.9 | −0.9 | −0.8 | −0.7 | −0.6 | −0.5 | −0.4 | −0.3 |
| | 10 | −0.7 | −0.8 | −0.9 | −0.9 | −1 | −1 | −1 | −1 | −1 | −0.9 | −0.9 | −0.8 | −0.7 | −0.6 | −0.5 | −0.4 |
| | 11 | −0.6 | −0.7 | −0.8 | −0.9 | −0.9 | −1 | −1 | −1 | −1 | −1 | −0.9 | −0.9 | −0.8 | −0.7 | −0.6 | −0.5 |
| | 12 | −0.5 | −0.6 | −0.7 | −0.8 | −0.9 | −0.9 | −1 | −1 | −1 | −1 | −1 | −0.9 | −0.9 | −0.8 | −0.7 | −0.6 |
| | 13 | −0.4 | −0.5 | −0.6 | −0.7 | −0.8 | −0.9 | −0.9 | −1 | −1 | −1 | −1 | −1 | −0.9 | −0.9 | −0.8 | −0.7 |
| | 14 | −0.3 | −0.4 | −0.5 | −0.6 | −0.7 | −0.8 | −0.9 | −0.9 | −1 | −1 | −1 | −1 | −1 | −0.9 | −0.9 | −0.8 |
| | 15 | −0.1 | −0.3 | −0.4 | −0.5 | −0.6 | −0.7 | −0.8 | −0.9 | −0.9 | −1 | −1 | −1 | −1 | −1 | −0.9 | −0.9 |
| | 16 | 0 | −0.1 | −0.3 | −0.4 | −0.5 | −0.6 | −0.7 | −0.8 | −0.9 | −0.9 | −1 | −1 | −1 | −1 | −1 | −0.9 |
| | 17 | 0.13 | 0 | −0.1 | −0.3 | −0.4 | −0.5 | −0.6 | −0.7 | −0.8 | −0.9 | −0.9 | −1 | −1 | −1 | −1 | −1 |
| | 18 | 0.26 | 0.13 | 0 | −0.1 | −0.3 | −0.4 | −0.5 | −0.6 | −0.7 | −0.8 | −0.9 | −0.9 | −1 | −1 | −1 | −1 |
| | 19 | 0.38 | 0.26 | 0.13 | 0 | −0.1 | −0.3 | −0.4 | −0.5 | −0.6 | −0.7 | −0.8 | −0.9 | −0.9 | −1 | −1 | −1 |
| | 20 | 0.5 | 0.38 | 0.26 | 0.13 | 0 | −0.1 | −0.3 | −0.4 | −0.5 | −0.6 | −0.7 | −0.8 | −0.9 | −0.9 | −1 | −1 |
| | 21 | 0.61 | 0.5 | 0.38 | 0.26 | 0.13 | 0 | −0.1 | −0.3 | −0.4 | −0.5 | −0.6 | −0.7 | −0.8 | −0.9 | −0.9 | −1 |
| | 22 | 0.71 | 0.61 | 0.5 | 0.38 | 0.26 | 0.13 | 0 | −0.1 | −0.3 | −0.4 | −0.5 | −0.6 | −0.7 | −0.8 | −0.9 | −0.9 |
| | 23 | 0.79 | 0.71 | 0.61 | 0.5 | 0.38 | 0.26 | 0.13 | 0 | −0.1 | −0.3 | −0.4 | −0.5 | −0.6 | −0.7 | −0.8 | −0.9 |
| | 24 | 0.87 | 0.79 | 0.71 | 0.61 | 0.5 | 0.38 | 0.26 | 0.13 | 0 | −0.1 | −0.3 | −0.4 | −0.5 | −0.6 | −0.7 | −0.8 |
| | 25 | 0.92 | 0.87 | 0.79 | 0.71 | 0.61 | 0.5 | 0.38 | 0.26 | 0.13 | 0 | −0.1 | −0.3 | −0.4 | −0.5 | −0.6 | −0.7 |
| | 26 | 0.97 | 0.92 | 0.87 | 0.79 | 0.71 | 0.61 | 0.5 | 0.38 | 0.26 | 0.13 | 0 | −0.1 | −0.3 | −0.4 | −0.5 | −0.6 |
| | 27 | 0.99 | 0.97 | 0.92 | 0.87 | 0.79 | 0.71 | 0.61 | 0.5 | 0.38 | 0.26 | 0.13 | 0 | −0.1 | −0.3 | −0.4 | −0.5 |
| | 28 | 1 | 0.99 | 0.97 | 0.92 | 0.87 | 0.79 | 0.71 | 0.61 | 0.5 | 0.38 | 0.26 | 0.13 | 0 | −0.1 | −0.3 | −0.4 |
| | 29 | 0.99 | 1 | 0.99 | 0.97 | 0.92 | 0.87 | 0.79 | 0.71 | 0.61 | 0.5 | 0.38 | 0.26 | 0.13 | 0 | −0.1 | −0.3 |
| | 30 | 0.97 | 0.99 | 1 | 0.99 | 0.97 | 0.92 | 0.87 | 0.79 | 0.71 | 0.61 | 0.5 | 0.38 | 0.26 | 0.13 | 0 | −0.1 |
| | 31 | 0.92 | 0.97 | 0.99 | 1 | 0.99 | 0.97 | 0.92 | 0.87 | 0.79 | 0.71 | 0.61 | 0.5 | 0.38 | 0.26 | 0.13 | 0 |
| | 32 | 0.87 | 0.92 | 0.97 | 0.99 | 1 | 0.99 | 0.97 | 0.92 | 0.87 | 0.79 | 0.71 | 0.61 | 0.5 | 0.38 | 0.26 | 0.13 |
| | 33 | 0.79 | 0.87 | 0.92 | 0.97 | 0.99 | 1 | 0.99 | 0.97 | 0.92 | 0.87 | 0.79 | 0.71 | 0.61 | 0.5 | 0.38 | 0.26 |
| | 34 | 0.71 | 0.79 | 0.87 | 0.92 | 0.97 | 0.99 | 1 | 0.99 | 0.97 | 0.92 | 0.87 | 0.79 | 0.71 | 0.61 | 0.5 | 0.38 |
| | 35 | 0.61 | 0.71 | 0.79 | 0.87 | 0.92 | 0.97 | 0.99 | 1 | 0.99 | 0.97 | 0.92 | 0.87 | 0.79 | 0.71 | 0.61 | 0.5 |
| | 36 | 0.5 | 0.61 | 0.71 | 0.79 | 0.87 | 0.92 | 0.97 | 0.99 | 1 | 0.99 | 0.97 | 0.92 | 0.87 | 0.79 | 0.71 | 0.61 |
| | 37 | 0.38 | 0.5 | 0.61 | 0.71 | 0.79 | 0.87 | 0.92 | 0.97 | 0.99 | 1 | 0.99 | 0.97 | 0.92 | 0.87 | 0.79 | 0.71 |
| | 38 | 0.26 | 0.38 | 0.5 | 0.61 | 0.71 | 0.79 | 0.87 | 0.92 | 0.97 | 0.99 | 1 | 0.99 | 0.97 | 0.92 | 0.87 | 0.79 |
| | 39 | 0.13 | 0.26 | 0.38 | 0.5 | 0.61 | 0.71 | 0.79 | 0.87 | 0.92 | 0.97 | 0.99 | 1 | 0.99 | 0.97 | 0.92 | 0.87 |
| | 40 | 0 | 0.13 | 0.26 | 0.38 | 0.5 | 0.61 | 0.71 | 0.79 | 0.87 | 0.92 | 0.97 | 0.99 | 1 | 0.99 | 0.97 | 0.92 |
| | 41 | −0.1 | 0 | 0.13 | 0.26 | 0.38 | 0.5 | 0.61 | 0.71 | 0.79 | 0.87 | 0.92 | 0.97 | 0.99 | 1 | 0.99 | 0.97 |
| | 42 | −0.3 | −0.1 | 0 | 0.13 | 0.26 | 0.38 | 0.5 | 0.61 | 0.71 | 0.79 | 0.87 | 0.92 | 0.97 | 0.99 | 1 | 0.99 |
| | 43 | −0.4 | −0.3 | −0.1 | 0 | 0.13 | 0.26 | 0.38 | 0.5 | 0.61 | 0.71 | 0.79 | 0.87 | 0.92 | 0.97 | 0.99 | 1 |
| | 44 | −0.5 | −0.4 | −0.3 | −0.1 | 0 | 0.13 | 0.26 | 0.38 | 0.5 | 0.61 | 0.71 | 0.79 | 0.87 | 0.92 | 0.97 | 0.99 |
| | 45 | −0.6 | −0.5 | −0.4 | −0.3 | −0.1 | 0 | 0.13 | 0.26 | 0.38 | 0.5 | 0.61 | 0.71 | 0.79 | 0.87 | 0.92 | 0.97 |
| | 46 | −0.7 | −0.6 | −0.5 | −0.4 | −0.3 | −0.1 | 0 | 0.13 | 0.26 | 0.38 | 0.5 | 0.61 | 0.71 | 0.79 | 0.87 | 0.92 |
| | 47 | −0.8 | −0.7 | −0.6 | −0.5 | −0.4 | −0.3 | −0.1 | 0 | 0.13 | 0.26 | 0.38 | 0.5 | 0.61 | 0.71 | 0.79 | 0.87 |
| | 48 | −0.9 | −0.8 | −0.7 | −0.6 | −0.5 | −0.4 | −0.3 | −0.1 | 0 | 0.13 | 0.26 | 0.38 | 0.5 | 0.61 | 0.71 | 0.79 |

With respect to plural measurement errors when phase differences between phases at the start time and the end time of the measurement by the length measurement roll 101 are the same as each other, the controller 200 calculated an average value of the plural measurement errors as the measurement error, based on the results of the measurement shown in the table 1. Further, the controller 200 calculated a standard deviation of the plural measurement errors when the phase differences of the length measurement roll 101 are the same as each other, by using the calculated average value. The calculated standard deviation is indicated in a solid line in FIG. 9B. A horizontal axis in FIG. 9B indicates the phase difference between phases at the start time and the end time of the measurement by the length measurement roll 101, and a vertical axis in FIG. 9B indicates the measurement error. The measurement error changes according to the gap α[mm] of the center of rotation from the center position of the length measurement roll 101. For example, FIG. 9B indicates the case where the gap α is 1 [mm]. When the gap α is 2 [mm], the standard deviation of the measurement errors shows a double value of the value shown in the solid line of FIG. 9B.

Figure 9B:
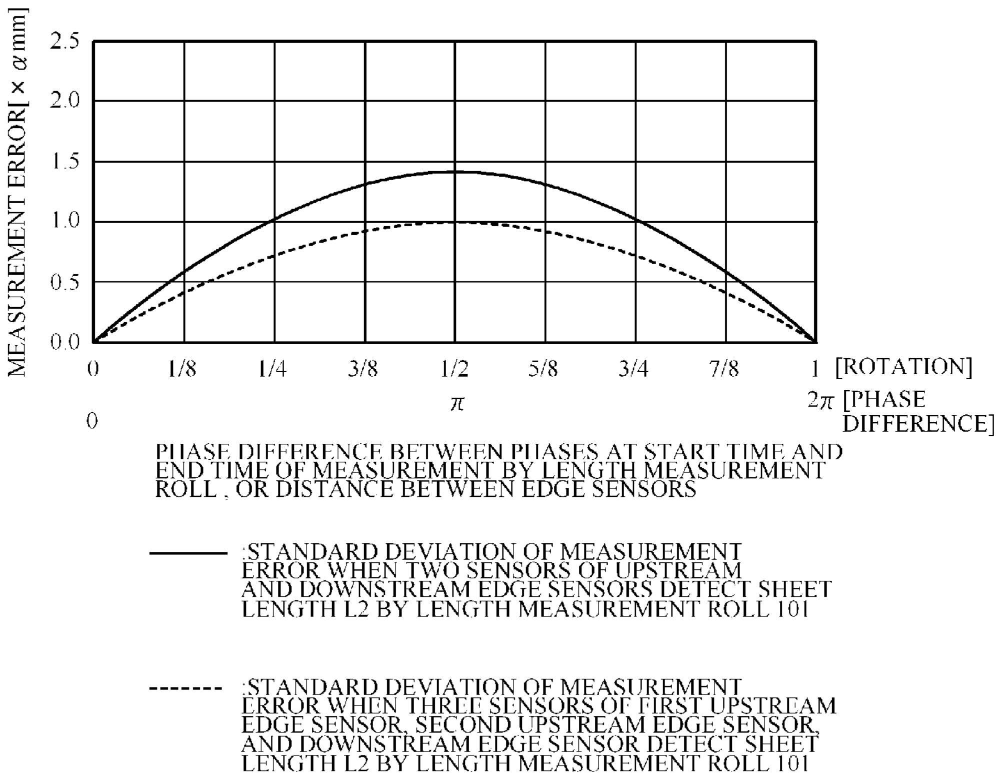
FIG. 9B is a diagram showing a relationship between a distance between the edge sensors, and a standard deviation of the measurement error included in the sheet length measured with the length measurement roll.

As shown in FIG. 9B, when the phase difference between phases at the start time and the end time of the measurement by the length measurement roll 101 is π (i.e., one-half rotation of the length measurement roll 101), the standard deviation of the measurement errors becomes maximum. When the phase difference between phases at the start time and the end time of the measurement by the length measurement roll 101 is 0 (i.e., no rotation) or 2π (i.e., one rotation), the standard deviation of the measurement errors becomes minimum. The standard deviation of the measurement errors draws a sine curve which monotonously increases from 0 to the one-half rotation (i.e., the phase difference π), and monotonously decreases from the one-half rotation (i.e., the phase difference π) to the one rotation (i.e., the phase difference 2π).

The controller 200 selects a sheet length nearer to the integral multiples of the circumference length (hereinafter referred to as "LER") of the length measurement roll 101 from the sheet length L1 calculated at the first detection period and the sheet length L2 calculated at the second detection period. Specifically, the controller 200 divides the calculated sheet lengths LF1 and LF2 by the circumference length LER of the rotary encoder 103. The controller 200 calculates the surpluses of the division result, and calculates absolute values of values in which the respective one-half (rotations) are subtracted from the calculated surpluses. Then, the controller 200 selects a sheet length corresponding to a larger absolute value of the value in which one-half is subtracted from the calculated surplus, as the sheet length L2.

That is, the controller 200 first calculates the lengths of the surpluses, which are longer than the integral multiples of the circumference length LER, of the sheet lengths LF1 and LF2. The controller 200 calculates respective ratios of the lengths of the surpluses to the circumference length LER (i.e., one rotation). The controller 200 subtracts one-half from the calculated ratios, and judges the result of the subtraction having a larger absolute value, i.e., the result of the subtraction farther from one-half as a measurement value with a few measurement errors.

A description will be given of the process procedures of the controller 200 of the first exemplary embodiment, with reference to a flowchart of FIG. 11.

The controller 200 counts the pulse signal p2 output from the rotary encoder 103, for the first detection period in which the first upstream edge sensor 121 and the downstream edge sensor 125 are on. The controller 200 calculates the sheet length LF1 based on the number of counted pulse signals p2 (step S21). Further, the controller 200 divides the calculated sheet length LF1 by the circumference length LER of the length measurement roll 101, and calculates the surplus K1 of the division (step S22).

Similarly, the controller 200 counts the pulse signal p2 output from the rotary encoder 103, for the second detection period in which the second upstream edge sensor 122 and the downstream edge sensor 125 are on. The controller 200 calculates the sheet length LF2 based on the number of counted pulse signals p2 (step S23). Further, the controller 200 divides the calculated sheet length LF2 by the circumference length LER of the length measurement roll 101, and calculates the surplus K2 of the division (step S24).

Next, the controller 200 compares an absolute value of a value in which one-half is subtracted from the surplus K1 calculated in step S22, with an absolute value of a value in which one-half is subtracted from the surplus K2 calculated in step S24 (step S25). When the absolute value of the value in which one-half is subtracted from the surplus K1 is larger than the absolute value of the value in which one-half is subtracted from the surplus K2 (YES in step S25), the controller 200 selects the calculated sheet length LF1 as the sheet length L2 (step S26). When the absolute value of the value in which one-half is subtracted from the surplus K2 is larger than the absolute value of the value in which one-half is subtracted from the surplus K1 (NO in step S25), the controller 200 selects the calculated sheet length LF2 as the sheet length L2 (step S27). When the absolute values are the same as each other, the controller 200 may select the calculated sheet length LF1 or LF2.

Figure 11:
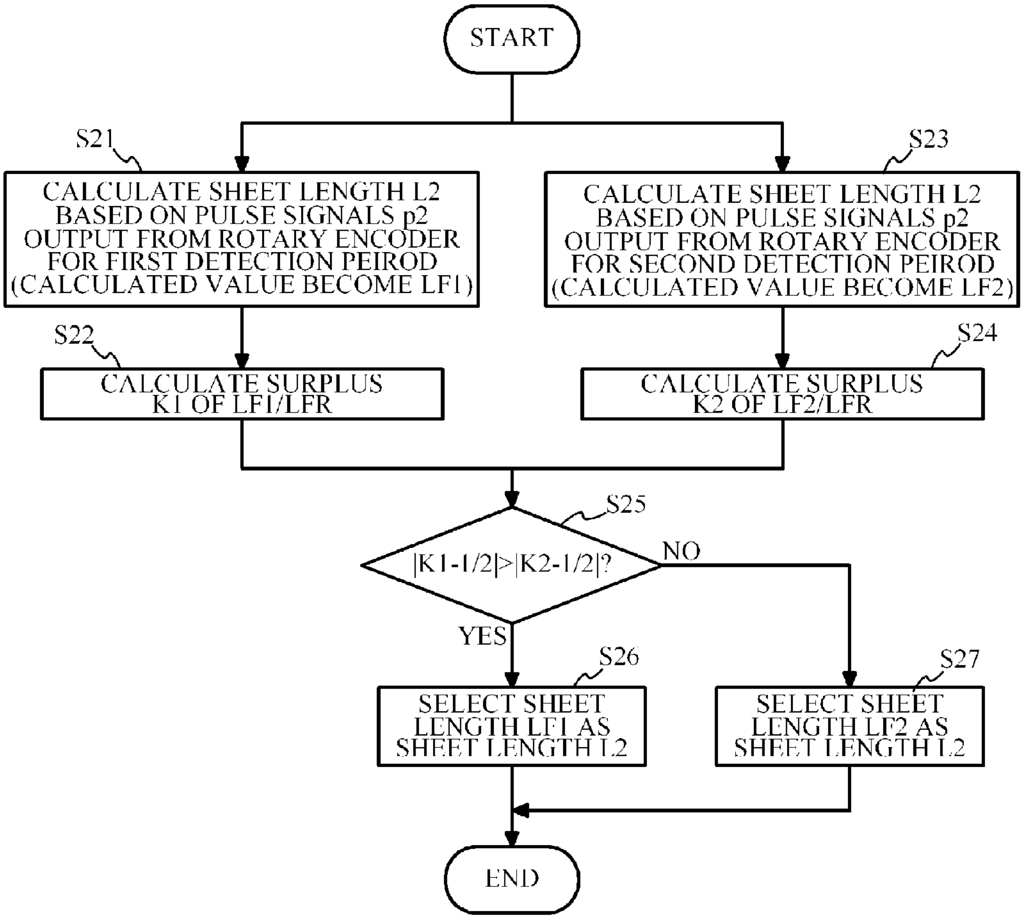
FIG. 11 is a flowchart showing process procedures of the controller of the first exemplary embodiment.

A curve shown in the dotted line of FIG. 9B indicates the standard deviation of the measurement errors when the measurement value nearer to the integral multiples of the circumference length LER of the length measurement roll 101 is selected according to the flowchart shown in FIG. 11. A curve shown in the solid line of FIG. 9B also indicates the standard deviation of the measurement errors when the edge sensors are installed on the upstream side and the downstream side of the length measurement roll 101 one by one, and a distance (or phase difference) between the edge sensors is changed. As is clear from FIG. 9B, the controller 200 selects the sheet length L2 nearer to the integral multiples of the circumference length LER of the length measurement roll 101, so that the error included in the measured sheet length L2 can be reduced.

(Variation Exemplary Embodiment)

Figure 12:
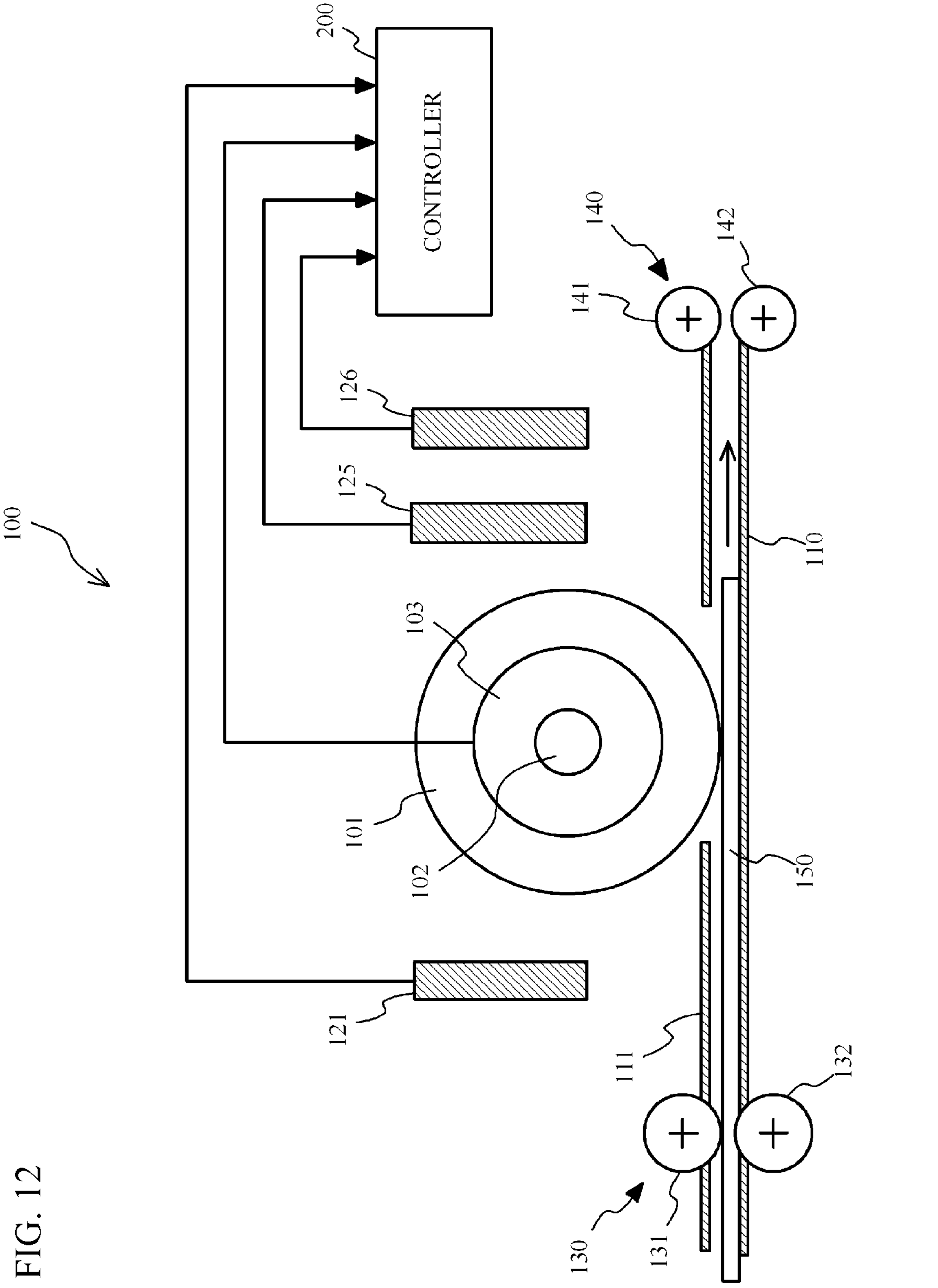
FIG. 12 is a diagram showing a variation example of a construction of the length measurement apparatus.

Although, in the above-mentioned first exemplary embodiment, the two edge sensors are installed on the upstream side of the length measurement roll 101, a single edge sensor may be installed on the upstream side of the length measurement roll 101, and two edge sensors may be installed on the downstream side of the length measurement roll 101, as shown in FIG. 12. In this case, it is assumed that a first downstream edge sensor 125 and a second downstream edge sensor 126 are installed on the downstream side of the length measurement roll 101, the first detection period is set to a period in which the first downstream edge sensor 125 and the second downstream edge sensor 126 detect the sheet 150, and the second detection period is set to a period in which the first upstream edge sensor 121 and the second downstream edge sensor 126 detect the sheet 150. Thus, even if the two edge sensors are installed on the downstream side of the length measurement roll 101, the same effect as first exemplary embodiment can be acquired.

As long as two or more detection periods decided from the upstream edge sensor and the first downstream edge sensor can be set, the number of edge sensors to be installed on the upstream and the downstream side of the length measurement roll 101 is not limited. In this case, three or more detection periods may be set.

(Second Exemplary Embodiment)

A description will be given of a second exemplary embodiment of the present invention, with reference to the accompanying drawings.

In second exemplary embodiment, information on a standardized size of the sheet 150 stored into the RAM 203 is used. Here, the standardized size is a sheet size decided by Japanese Industrial Standards (JIS). The actual sheet size is not necessarily identical with the standardized size. This is because an error occurs when a sheet source is cut into a given size in a manufacturing process of the sheet. The controller 200 acquires the sheet length of the conveying direction (hereinafter referred to as "standard sheet length LS") from the standardized size of the sheet 150 stored into the RAM 203. Alternatively, the controller 200 detects the standard sheet length LS with sensors such as path sensors, and selects the edge sensors which are used for the length measurement, based on the standard sheet length LS. Details of the selection method will be described later while referring to a flowchart. The controller 200 measures the sheet length L2 of the sheet 150 actually conveyed on the conveying path, for the detection period prescribed by the combination of the selected edge sensors. The controller 200 calculates the sheet length L by adding the values of the above-mentioned sheet lengths L1, L3, and L4 to the measured sheet length L2. The controller 200 controls image forming timing based on the calculated sheet length L.

It should be noted that each path sensor detects the passage timing of the sheet 150 conveyed on the conveying path. The controller 200 calculates the standard sheet length LS based on a conveying speed of the sheet, a period between timing when the path sensor detects the front edge of the sheet, and timing when another path sensor detects the rear edge of the sheet. As in the standard sheet length LS acquired from the standardized size, the calculated standard sheet length LS is not necessarily identical with the actual sheet size. Therefore, the following processes are executed to calculate the sheet length with high accuracy.

Figure 13:
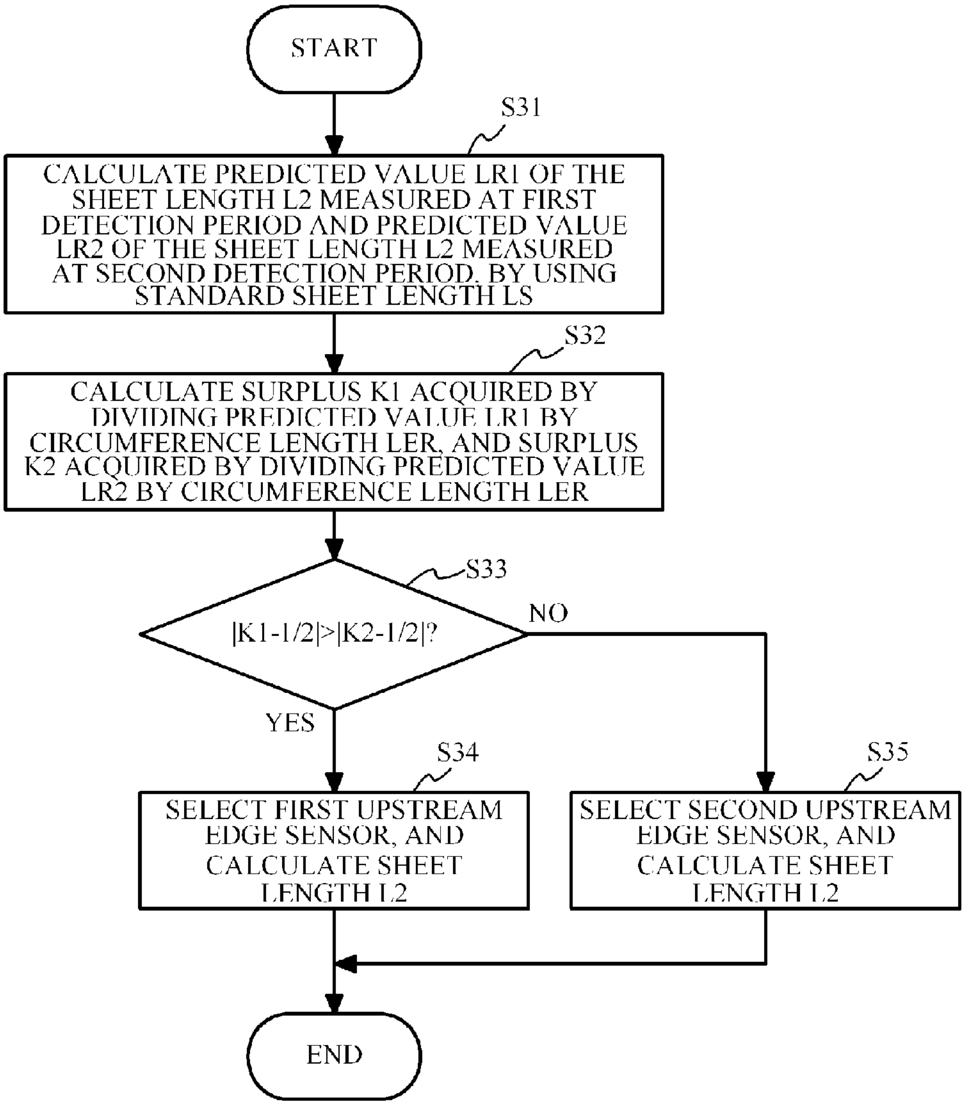
FIG. 13 is a flowchart showing process procedures of the controller of a second exemplary embodiment.

A description will be given of the process procedures of the controller 200 of the second exemplary embodiment, with reference to a flowchart of FIG. 13.

When the operation unit 350 selects the feeding tray which feeds the sheet, the controller 200 reads out the standardized size of the sheet accommodated in the selected feeding tray, from the RAM 203. Further, the controller 200 acquires the standard sheet length LS which is the sheet length of the conveying direction, from the read-out standardized size.

Also, the controller 200 reads out distance information on a distance between the first upstream edge sensor 121 and the downstream edge sensor 125, and distance information on a distance between the second upstream edge sensor 122 and the downstream edge sensor 125, from the RAM 203.

Next, the controller 200 calculates a predicted value (hereinafter referred to as "LR1") of the sheet length L2 measured at the first detection period, based on the acquired standard sheet length LS, and the sheet lengths L1, L3, and L4 (step S31). The length L4 is the distance between the first upstream edge sensor 121 and the downstream edge sensor 125, which is read out from the RAM 203. The sheet lengths L1 and L3 may be calculated by multiplying a period corresponding to the single pulse signal p2 by the conveying speed of the sheet. The period corresponding to the single pulse signal p2 is a period between timing when the signal level of the pulse signal p2 changes to a low level, and timing when the signal level of the pulse signal p2 changes to a high level, or a period between timing when the signal level of the pulse signal p2 changes to the high level, and timing when the signal level of the pulse signal p2 changes to the low level, for example.

Similarly, the controller 200 calculates a predicted value (hereinafter referred to as "LR2") of the sheet length L2 measured at the second detection period (step S31). The length L4 used for this calculation is the distance between the second upstream edge sensor 122 and the downstream edge sensor 125, which is read out from the RAM 203.

Next, the controller 200 calculates the surplus K1 acquired by dividing the calculated predicted value LR1 by the circumference length LER of the length measurement roll 101, and the surplus K2 acquired by dividing the calculated predicted value LR2 by the circumference length LER of the length measurement roll 101 (step S32).

Next, the controller 200 compares an absolute value of a value in which one-half is subtracted from the calculated surplus K1, with an absolute value of a value in which one-half is subtracted from the surplus K2 (step S33). When the absolute value of the value in which one-half is subtracted from the surplus K1 is larger than the absolute value of the value in which one-half is subtracted from the surplus K2 (YES in step S33), the controller 200 selects the first upstream edge sensor 121 (step S34), and executes the length measurement with the length measurement roll 101. That is, the controller 200 calculates the sheet length L2 based on the pulse signal p2 output from the rotary encoder 103, for a period in which the first upstream edge sensor 121 and the downstream edge sensor 125 are on. When the absolute value of the value in which one-half is subtracted from the surplus K2 is larger than the absolute value of the value in which one-half is subtracted from the surplus K1 (NO in step S33), the controller 200 selects the second upstream edge sensor 122 (step S35), and executes the length measurement with the length measurement roll 101. That is, the controller 200 calculates the sheet length L2 based on the pulse signal p2 output from the rotary encoder 103, for a period in which the second upstream edge sensor 122 and the downstream edge sensor 125 are on.

Thus, according to the second exemplary embodiment, the controller 200 selects the detection period in which the error of the sheet length L2 measured with the length measurement roll 101 decreases.

(Third Exemplary Embodiment)

A description will be given of a third exemplary embodiment of the present invention, with reference to the accompanying drawings.

In the third exemplary embodiment, a distance between the first upstream edge sensor 121 and the second upstream edge sensor 122 is set to (2n−1)/4 (n: any natural number) of the circumference length LER of the length measurement roll 101. A reason to set such a distance will be described hereinafter.

Tables 2 and 3 show results in which the controller 200 measures the sheet length L2 with the length measurement roll 101 while changing the distance between the first upstream edge sensor 121 and the second upstream edge sensor 122 within a range of one rotation (i.e., circumference length) of the length measurement roll 101, and calculates the measurement error of the measured sheet length L2. A fewer measurement error is selected from among the sheet length L2 measured at the first detection period, and the sheet length L2 measured at the second detection period, as the above-mentioned measurement error.

TABLE 2

| | | DISTANCE BETWEEN FIRST UPSTREAM EDGE SENSOR AND SECOND UPSTREAM EDGE SENSOR | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| PHASE | 1 | 0 | 0.13 | 0.13 | 0.13 | 0.13 | 0.3 | 0.13 | 0.13 | 0.13 | 0.13 | 0.13 | 0.13 | 0.13 | 0.13 | 0.13 | 0.13 |
| DIFFERENCE | 2 | 0.13 | 0 | −0.1 | 0.26 | 0.26 | 0.26 | 0.26 | 0.26 | 0.26 | 0.26 | 0.26 | 0.26 | 0.26 | 0.26 | 0.26 | 0.26 |
| BETWEEN | 3 | 0.26 | 0.13 | 0 | −0.1 | −0.3 | 0.38 | 0.38 | 0.38 | 0.38 | 0.38 | 0.38 | 0.38 | 0.38 | 0.38 | 0.38 | 0.38 |
| PHASES AT | 4 | 0.38 | 0.26 | 0.13 | 0 | −0.1 | −0.3 | −0.4 | 0.5 | 0.5 | 0.5 | 0.5 | 0.5 | 0.5 | 0.5 | 0.5 | 0.5 |
| START TIME | 5 | 0.5 | 0.38 | 0.26 | 0.13 | 0 | −0.1 | −0.3 | −0.4 | −0.5 | 0.61 | 0.61 | 0.61 | 0.61 | 0.61 | 0.61 | 0.61 |
| AND END | 6 | 0.61 | 0.5 | 0.38 | 0.26 | 0.13 | 0 | −0.1 | −0.3 | −0.4 | −0.5 | −0.6 | 0.71 | 0.71 | 0.71 | 0.71 | 0.71 |
| TIME OF | 7 | 0.71 | 0.61 | 0.5 | 0.38 | 0.26 | 0.13 | 0 | −0.1 | −0.3 | −0.4 | −0.5 | −0.6 | −0.7 | 0.79 | 0.79 | 0.79 |
| MEASUREMENT | 8 | 0.79 | 0.71 | 0.61 | 0.5 | 0.38 | 0.26 | 0.13 | 0 | −0.1 | −0.3 | −0.4 | −0.5 | −0.6 | −0.7 | −0.8 | 0.87 |

TABLE 2-continued

DISTANCE BETWEEN FIRST UPSTREAM EDGE SENSOR AND SECOND UPSTREAM EDGE SENSOR

| | | | | | | | | | | | | | | | | | |
|---|---|---|---|---|---|---|---|---|---|---|---|---|---|---|---|---|---|
| BY LENGTH | 9 | 0.87 | 0.79 | 0.71 | 0.61 | 0.5 | 0.38 | 0.26 | 0.13 | 0 | −0.1 | −0.3 | −0.4 | −0.5 | −0.6 | −0.7 | −0.8 |
| MEASUREMENT | 10 | 0.92 | 0.87 | 0.79 | 0.71 | 0.61 | 0.5 | 0.38 | 0.26 | 0.13 | 0 | −0.1 | −0.3 | −0.4 | −0.5 | −0.6 | −0.7 |
| ROLL | 11 | 0.97 | 0.92 | 0.87 | 0.79 | 0.71 | 0.61 | 0.5 | 0.38 | 0.26 | 0.13 | 0 | −0.1 | −0.3 | −0.4 | −0.5 | −0.6 |
| | 12 | 0.99 | 0.97 | 0.92 | 0.87 | 0.79 | 0.71 | 0.61 | 0.5 | 0.38 | 0.26 | 0.13 | 0 | −0.1 | −0.3 | −0.4 | −0.5 |
| | 13 | 0.99 | 0.99 | 0.97 | 0.92 | 0.87 | 0.79 | 0.71 | 0.61 | 0.5 | 0.38 | 0.26 | 0.13 | 0 | −0.1 | −0.3 | −0.4 |
| | 14 | 0.97 | 0.97 | 0.97 | 0.97 | 0.92 | 0.87 | 0.79 | 0.71 | 0.61 | 0.5 | 0.38 | 0.26 | 0.13 | 0 | −0.1 | −0.3 |
| | 15 | 0.92 | 0.92 | 0.92 | 0.92 | 0.92 | 0.92 | 0.87 | 0.79 | 0.71 | 0.61 | 0.5 | 0.38 | 0.26 | 0.13 | 0 | −0.1 |
| | 16 | 0.87 | 0.87 | 0.87 | 0.87 | 0.87 | 0.87 | 0.87 | 0.87 | 0.79 | 0.71 | 0.61 | 0.5 | 0.38 | 0.26 | 0.13 | 0 |
| | 17 | 0.79 | 0.79 | 0.79 | 0.79 | 0.79 | 0.79 | 0.79 | 0.79 | 0.79 | 0.79 | 0.71 | 0.61 | 0.5 | 0.38 | 0.26 | 0.13 |
| | 18 | 0.71 | 0.71 | 0.71 | 0.71 | 0.71 | 0.71 | 0.71 | 0.71 | 0.71 | 0.71 | 0.71 | 0.71 | 0.61 | 0.5 | 0.38 | 0.26 |
| | 19 | 0.61 | 0.61 | 0.61 | 0.61 | 0.61 | 0.61 | 0.61 | 0.61 | 0.61 | 0.61 | 0.61 | 0.61 | 0.61 | 0.61 | 0.5 | 0.38 |
| | 20 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | 21 | 0.38 | 0.38 | 0.38 | 0.38 | 0.38 | 0.38 | 0.38 | 0.38 | 0.38 | 0.38 | 0.38 | 0.38 | 0.38 | 0.38 | 0.38 | 0.38 |
| | 22 | 0.26 | 0.26 | 0.26 | 0.26 | 0.26 | 0.26 | 0.26 | 0.26 | 0.26 | 0.26 | 0.26 | 0.26 | 0.26 | 0.26 | 0.26 | 0.26 |
| | 23 | 0.13 | 0.13 | 0.13 | 0.13 | 0.13 | 0.13 | 0.13 | 0.13 | 0.13 | 0.13 | 0.13 | 0.13 | 0.13 | 0.13 | 0.13 | 0.13 |
| | 24 | 0 | 0 | 0 | 0 | 0 | 0 | 0 | 0 | 0 | 0 | 0 | 0 | 0 | 0 | 0 | 0 |
| | 25 | 0 | −0.1 | −0.1 | −0.1 | −0.1 | −0.1 | −0.1 | −0.1 | −0.1 | −0.1 | −0.1 | −0.1 | −0.1 | −0.1 | −0.1 | −0.1 |
| | 26 | −0.1 | 0 | 0.13 | −0.3 | −0.3 | −0.3 | −0.3 | −0.3 | −0.3 | −0.3 | −0.3 | −0.3 | −0.3 | −0.3 | −0.3 | −0.3 |
| | 27 | −0.3 | −0.1 | 0 | 0.13 | 0.26 | −0.4 | −0.4 | −0.4 | −0.4 | −0.4 | −0.4 | −0.4 | −0.4 | −0.4 | −0.4 | −0.4 |
| | 28 | −0.4 | −0.3 | −0.1 | 0 | 0.13 | 0.26 | 0.38 | −0.5 | −0.5 | −0.5 | −0.5 | −0.5 | −0.5 | −0.5 | −0.5 | −0.5 |
| | 29 | −0.5 | −0.4 | −0.3 | −0.1 | 0 | 0.13 | 0.26 | 0.38 | 0.5 | −0.6 | −0.6 | −0.6 | −0.6 | −0.6 | −0.6 | −0.6 |
| | 30 | −0.6 | −0.5 | −0.4 | −0.3 | −0.1 | 0 | 0.13 | 0.26 | 0.38 | 0.5 | 0.61 | −0.7 | −0.7 | −0.7 | −0.7 | −0.7 |
| | 31 | −0.7 | −0.6 | −0.5 | −0.4 | −0.3 | −0.1 | 0 | 0.13 | 0.26 | 0.38 | 0.5 | 0.61 | 0.71 | −0.8 | −0.8 | −0.8 |
| | 32 | −0.8 | −0.7 | −0.6 | −0.5 | −0.4 | −0.3 | −0.1 | 0 | 0.13 | 0.26 | 0.38 | 0.5 | 0.61 | 0.71 | 0.79 | −0.9 |
| | 33 | −0.9 | −0.8 | −0.7 | −0.6 | −0.5 | −0.4 | −0.3 | −0.1 | 0 | 0.13 | 0.26 | 0.38 | 0.5 | 0.61 | 0.71 | 0.79 |
| | 34 | −0.9 | −0.9 | −0.8 | −0.7 | −0.6 | −0.5 | −0.4 | −0.3 | −0.1 | 0 | 0.13 | 0.26 | 0.38 | 0.5 | 0.61 | 0.71 |
| | 35 | −1 | −0.9 | −0.9 | −0.8 | −0.7 | −0.6 | −0.5 | −0.4 | −0.3 | −0.1 | 0 | 0.13 | 0.26 | 0.38 | 0.5 | 0.61 |
| | 36 | −1 | −1 | −0.9 | −0.9 | −0.8 | −0.7 | −0.6 | −0.5 | −0.4 | −0.3 | −0.1 | 0 | 0.13 | 0.26 | 0.38 | 0.5 |
| | 37 | −1 | −1 | −1 | −0.9 | −0.9 | −0.8 | −0.7 | −0.6 | −0.5 | −0.4 | −0.3 | −0.1 | 0 | 0.13 | 0.26 | 0.38 |
| | 38 | −1 | −1 | −1 | −1 | −0.9 | −0.9 | −0.8 | −0.7 | −0.6 | −0.5 | −0.4 | −0.3 | −0.1 | 0 | 0.13 | 0.26 |
| | 39 | −0.9 | −0.9 | −0.9 | −0.9 | −0.9 | −0.9 | −0.9 | −0.8 | −0.7 | −0.6 | −0.5 | −0.4 | −0.3 | −0.1 | 0 | 0.13 |
| | 40 | −0.9 | −0.9 | −0.9 | −0.9 | −0.9 | −0.9 | −0.9 | −0.9 | −0.8 | −0.7 | −0.6 | −0.5 | −0.4 | −0.3 | −0.1 | 0 |
| | 41 | −0.8 | −0.8 | −0.8 | −0.8 | −0.8 | −0.8 | −0.8 | −0.8 | −0.8 | −0.8 | −0.7 | −0.6 | −0.5 | −0.4 | −0.3 | −0.1 |
| | 42 | −0.7 | −0.7 | −0.7 | −0.7 | −0.7 | −0.7 | −0.7 | −0.7 | −0.7 | −0.7 | −0.7 | −0.7 | −0.6 | −0.5 | −0.4 | −0.3 |
| | 43 | −0.6 | −0.6 | −0.6 | −0.6 | −0.6 | −0.6 | −0.6 | −0.6 | −0.6 | −0.6 | −0.6 | −0.6 | −0.6 | −0.6 | −0.5 | −0.4 |
| | 44 | −0.5 | −0.5 | −0.5 | −0.5 | −0.5 | −0.5 | −0.5 | −0.5 | −0.5 | −0.5 | −0.5 | −0.5 | −0.5 | −0.5 | −0.5 | −0.5 |
| | 45 | −0.4 | −0.4 | −0.4 | −0.4 | −0.4 | −0.4 | −0.4 | −0.4 | −0.4 | −0.4 | −0.4 | −0.4 | −0.4 | −0.4 | −0.4 | −0.4 |
| | 46 | −0.3 | −0.3 | −0.3 | −0.3 | −0.3 | −0.3 | −0.3 | −0.3 | −0.3 | −0.3 | −0.3 | −0.3 | −0.3 | −0.3 | −0.3 | −0.3 |
| | 47 | −0.1 | −0.1 | −0.1 | −0.1 | −0.1 | −0.1 | −0.1 | −0.1 | −0.1 | −0.1 | −0.1 | −0.1 | −0.1 | −0.1 | −0.1 | −0.1 |
| | 48 | −0 | −0 | −0 | −0 | −0 | −0 | −0 | −0 | −0 | −0 | −0 | −0 | −0 | −0 | −0 | −0 |

| | | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| PHASE | 1 | 0.13 | 0.13 | 0.13 | 0.13 | 0.13 | 0.13 | 0.13 | 0.13 | −0 | 0.13 | 0.13 | 0.13 | 0.13 | 0.13 | 0.13 | 0.13 |
| DIFFERENCE | 2 | 0.26 | 0.26 | 0.26 | 0.26 | 0.26 | 0.26 | 0.26 | 0.26 | −0.1 | −0 | 0.13 | 0.26 | 0.26 | 0.26 | 0.26 | 0.26 |
| BETWEEN | 3 | 0.38 | 0.38 | 0.38 | 0.38 | 0.38 | 0.38 | 0.38 | 0.38 | −0.3 | −0.1 | −0 | 0.13 | 0.26 | 0.38 | 0.38 | 0.38 |
| PHASES AT | 4 | 0.5 | 0.5 | 0.5 | 0.5 | 0.5 | 0.5 | 0.5 | 0.5 | −0.4 | −0.3 | −0.1 | −0 | 0.13 | 0.26 | 0.38 | 0.5 |
| START TIME | 5 | 0.61 | 0.61 | 0.61 | 0.61 | 0.61 | 0.61 | 0.61 | 0.61 | −0.5 | −0.4 | −0.3 | −0.1 | −0 | 0.13 | 0.26 | 0.38 |
| AND END | 6 | 0.71 | 0.71 | 0.71 | 0.71 | 0.71 | 0.71 | 0.71 | 0.71 | −0.6 | −0.5 | −0.4 | −0.3 | −0.1 | −0 | 0.13 | 0.26 |
| TIME OF | 7 | 0.79 | 0.79 | 0.79 | 0.79 | 0.79 | 0.79 | 0.79 | 0.79 | −0.7 | −0.6 | −0.5 | −0.4 | −0.3 | −0.1 | −0 | 0.13 |
| MEASUREMENT | 8 | 0.81 | 0.87 | 0.87 | 0.87 | 0.87 | 0.87 | 0.87 | 0.87 | −0.8 | −0.7 | −0.6 | −0.5 | −0.4 | −0.3 | −0.1 | −0 |
| BY LENGTH | 9 | −0.9 | 0.92 | 0.92 | 0.92 | 0.92 | 0.92 | 0.92 | 0.92 | −0.9 | −0.8 | −0.7 | −0.6 | −0.5 | −0.4 | −0.3 | −0.1 |
| MEASUREMENT | 10 | −0.8 | −0.9 | −0.9 | 0.91 | 0.97 | 0.97 | 0.91 | 0.97 | −0.9 | −0.9 | −0.8 | −0.7 | −0.6 | −0.5 | −0.4 | −0.3 |
| ROLL | 11 | −0.7 | −0.8 | −0.9 | −0.9 | −1 | 0.99 | 0.99 | 0.99 | −1 | −0.9 | −0.9 | −0.8 | −0.7 | −0.6 | −0.5 | −0.4 |
| | 12 | −0.6 | −0.7 | −0.8 | −0.9 | −0.9 | −1 | −1 | −1 | −1 | −1 | −0.9 | −0.9 | −0.8 | −0.7 | −0.6 | −0.5 |
| | 13 | −0.5 | −0.6 | −0.7 | −0.8 | −0.9 | −0.9 | −1 | 0.99 | 0.99 | 0.99 | −1 | −0.9 | −0.9 | −0.8 | −0.7 | −0.6 |
| | 14 | −0.4 | −0.5 | −0.6 | −0.7 | −0.8 | −0.9 | −0.9 | 0.97 | 0.97 | 0.97 | 0.97 | 0.97 | −0.9 | −0.9 | −0.8 | −0.7 |
| | 15 | −0.3 | −0.4 | −0.5 | −0.6 | −0.7 | −0.8 | −0.9 | 0.92 | 0.92 | 0.92 | 0.92 | 0.92 | 0.92 | 0.92 | −0.9 | −0.8 |
| | 16 | −0.1 | −0.3 | −0.4 | −0.5 | −0.6 | −0.7 | −0.8 | 0.87 | 0.87 | 0.87 | 0.87 | 0.87 | 0.87 | 0.87 | 0.87 | 0.87 |
| | 17 | 0 | −0.1 | −0.3 | −0.4 | −0.5 | −0.6 | −0.7 | 0.79 | 0.79 | 0.79 | 0.79 | 0.79 | 0.79 | 0.79 | 0.79 | 0.79 |
| | 18 | 0.13 | 0 | −0.1 | −0.3 | −0.4 | −0.5 | −0.6 | −0.7 | 0.71 | 0.71 | 0.71 | 0.71 | 0.71 | 0.71 | 0.71 | 0.71 |
| | 19 | 0.26 | 0.13 | 0 | −0.1 | −0.3 | −0.4 | −0.5 | 0.61 | 0.61 | 0.61 | 0.61 | 0.61 | 0.61 | 0.61 | 0.61 | 0.61 |
| | 20 | 0.38 | 0.26 | 0.13 | 0 | −0.1 | −0.3 | −0.4 | 0.5 | 0.5 | 0.5 | 0.5 | 0.5 | 0.5 | 0.5 | 0.5 | 0.5 |
| | 21 | 0.38 | 0.38 | 0.26 | 0.13 | 0 | −0.1 | −0.3 | 0.38 | 0.38 | 0.38 | 0.38 | 0.38 | 0.38 | 0.38 | 0.38 | 0.38 |
| | 22 | 0.26 | 0.26 | 0.26 | 0.26 | 0.13 | 0 | −0.1 | 0.26 | 0.26 | 0.26 | 0.26 | 0.26 | 0.26 | 0.26 | 0.26 | 0.26 |
| | 23 | 0.13 | 0.13 | 0.13 | 0.13 | 0.13 | 0.13 | 0 | 0.13 | 0.13 | 0.13 | 0.13 | 0.13 | 0.13 | 0.13 | 0.13 | 0.13 |
| | 24 | 0 | 0 | 0 | 0 | 0 | 0 | 0 | 0 | 0 | 0 | 0 | 0 | 0 | 0 | 0 | 0 |
| | 25 | −0.1 | −0.1 | −0.1 | −0.1 | −0.1 | −0.1 | −0.1 | −0.1 | −0.1 | −0.1 | −0.1 | −0.1 | −0.1 | −0.1 | −0.1 | −0.1 |
| | 26 | −0.3 | −0.3 | −0.3 | −0.3 | −0.3 | −0.3 | −0.3 | −0.3 | 0.13 | 0 | −0.1 | −0.3 | −0.3 | −0.3 | −0.3 | −0.3 |
| | 27 | −0.4 | −0.4 | −0.4 | −0.4 | −0.4 | −0.4 | −0.4 | −0.4 | 0.26 | 0.13 | 0 | −0.1 | −0.3 | −0.4 | −0.4 | −0.4 |
| | 28 | −0.5 | −0.5 | −0.5 | −0.5 | −0.5 | −0.5 | −0.5 | −0.5 | 0.38 | 0.26 | 0.13 | 0 | −0.1 | −0.3 | −0.4 | −0.5 |
| | 29 | −0.6 | −0.6 | −0.6 | −0.6 | −0.6 | −0.6 | −0.6 | −0.6 | 0.5 | 0.38 | 0.26 | 0.13 | 0 | −0.1 | −0.3 | −0.4 |
| | 30 | −0.7 | −0.7 | −0.7 | −0.7 | −0.7 | −0.7 | −0.7 | −0.7 | 0.61 | 0.5 | 0.38 | 0.26 | 0.13 | 0 | −0.1 | −0.3 |
| | 31 | −0.8 | −0.8 | −0.8 | −0.8 | −0.8 | −0.8 | −0.8 | −0.8 | 0.71 | 0.61 | 0.5 | 0.38 | 0.26 | 0.13 | 0 | −0.1 |
| | 32 | −0.9 | −0.9 | −0.9 | −0.9 | −0.9 | −0.9 | −0.9 | −0.9 | 0.79 | 0.71 | 0.61 | 0.5 | 0.38 | 0.26 | 0.13 | 0 |
| | 33 | 0.87 | −0.9 | −0.9 | −0.9 | −0.9 | −0.9 | −0.9 | −0.9 | 0.87 | 0.79 | 0.71 | 0.61 | 0.5 | 0.38 | 0.26 | 0.13 |
| | 34 | 0.79 | 0.87 | 0.92 | −1 | −1 | −1 | −1 | −1 | 0.92 | 0.87 | 0.79 | 0.71 | 0.61 | 0.5 | 0.38 | 0.26 |
| | 35 | 0.71 | 0.79 | 0.87 | 0.92 | 0.97 | −1 | −1 | −1 | 0.97 | 0.92 | 0.87 | 0.79 | 0.71 | 0.61 | 0.5 | 0.38 |

TABLE 2-continued

| DISTANCE BETWEEN FIRST UPSTREAM EDGE SENSOR AND SECOND UPSTREAM EDGE SENSOR | | | | | | | | | | | | | | | | | |
|---|---|---|---|---|---|---|---|---|---|---|---|---|---|---|---|---|---|
| | 36 | 0.61 | 0.71 | 0.79 | 0.87 | 0.92 | 0.97 | 0.99 | −1 | 0.99 | 0.97 | 0.92 | 0.87 | 0.79 | 0.71 | 0.61 | 0.5 |
| | 37 | 0.5 | 0.61 | 0.71 | 0.79 | 0.87 | 0.92 | 0.91 | −1 | −1 | −1 | 0.97 | 0.92 | 0.87 | 0.79 | 0.71 | 0.61 |
| | 38 | 0.38 | 0.5 | 0.61 | 0.71 | 0.79 | 0.87 | 0.92 | −1 | −1 | −1 | −1 | −1 | 0.92 | 0.87 | 0.79 | 0.71 |
| | 39 | 0.26 | 0.38 | 0.5 | 0.61 | 0.71 | 0.79 | 0.81 | −0.9 | −0.9 | −0.9 | −0.9 | −0.9 | −0.9 | −0.9 | 0.87 | 0.79 |
| | 40 | 0.13 | 0.26 | 0.38 | 0.5 | 0.61 | 0.71 | 0.79 | −0.9 | −0.9 | −0.9 | −0.9 | −0.9 | −0.9 | −0.9 | −0.9 | −0.9 |
| | 41 | 0 | 0.13 | 0.26 | 0.38 | 0.5 | 0.61 | 0.71 | 0.79 | −0.8 | −0.8 | −0.8 | −0.8 | −0.8 | −0.8 | −0.8 | −0.8 |
| | 42 | −0.1 | 0 | 0.13 | 0.26 | 0.38 | 0.5 | 0.61 | −0.7 | −0.7 | −0.7 | −0.7 | −0.7 | −0.7 | −0.7 | −0.7 | −0.7 |
| | 43 | −0.3 | −0.1 | 0 | 0.13 | 0.26 | 0.38 | 0.5 | −0.6 | −0.6 | −0.6 | −0.6 | −0.6 | −0.6 | −0.6 | −0.6 | −0.6 |
| | 44 | −0.4 | −0.3 | −0.1 | 0 | 0.13 | 0.26 | 0.38 | −0.5 | −0.5 | −0.5 | −0.5 | −0.5 | −0.5 | −0.5 | −0.5 | −0.5 |
| | 45 | −0.4 | −0.4 | −0.3 | −0.1 | 0 | 0.13 | 0.26 | −0.4 | −0.4 | −0.4 | −0.4 | −0.4 | −0.4 | −0.4 | −0.4 | −0.4 |
| | 46 | −0.3 | −0.3 | −0.3 | −0.3 | −0.1 | 0 | 0.13 | 0.26 | −0.3 | −0.3 | −0.3 | −0.3 | −0.3 | −0.3 | −0.3 | −0.3 |
| | 47 | −0.1 | −0.1 | −0.1 | −0.1 | −0.1 | −0.1 | 0 | 0.13 | −0.1 | −0.1 | −0.1 | −0.1 | −0.1 | −0.1 | −0.1 | −0.1 |
| | 48 | −0 | −0 | −0 | −0 | −0 | −0 | −0 | 0 | −0 | −0 | −0 | −0 | −0 | −0 | −0 | −0 |

TABLE 3

| DISTANCE BETWEEN FIRST UPSTREAM EDGE SENSOR AND SECOND UPSTREAM EDGE SENSOR | | | | | | | | | | | | | | | | | |
|---|---|---|---|---|---|---|---|---|---|---|---|---|---|---|---|---|---|
| | | 33 | 34 | 35 | 36 | 37 | 38 | 39 | 40 | 41 | 42 | 43 | 44 | 45 | 46 | 47 | 48 |
| PHASE | 1 | 0.13 | 0.13 | 0.13 | 0.13 | 0.13 | 0.13 | 0.13 | 0.13 | 0.13 | 0.13 | 0.13 | 0.13 | 0.13 | 0.13 | 0.13 | 0.13 |
| DIFFERENCE | 2 | 0.26 | 0.26 | 0.26 | 0.26 | 0.26 | 0.26 | 0.26 | 0.26 | 0.26 | 0.26 | 0.26 | 0.26 | 0.26 | 0.26 | 0.26 | 0.26 |
| BETWEEN | 3 | 0.38 | 0.38 | 0.38 | 0.38 | 0.38 | 0.38 | 0.38 | 0.38 | 0.38 | 0.38 | 0.38 | 0.38 | 0.38 | 0.38 | 0.38 | 0.38 |
| PHASES AT | 4 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| START TIME | 5 | 0.5 | 0.61 | 0.61 | 0.61 | 0.61 | 0.61 | 0.61 | 0.61 | 0.61 | 0.61 | 0.61 | 0.61 | 0.61 | 0.61 | 0.61 | 0.61 |
| AND END | 6 | 0.38 | 0.5 | 0.61 | 0.71 | 0.71 | 0.71 | 0.71 | 0.71 | 0.71 | 0.71 | 0.71 | 0.71 | 0.71 | 0.71 | 0.71 | 0.71 |
| TIME OF | 7 | 0.26 | 0.38 | 0.5 | 0.61 | 0.71 | 0.79 | 0.79 | 0.79 | 0.79 | 0.79 | 0.79 | 0.79 | 0.79 | 0.79 | 0.79 | 0.79 |
| MEASUREMENT | 8 | 0.13 | 0.26 | 0.38 | 0.5 | 0.61 | 0.71 | 0.79 | 0.87 | 0.87 | 0.87 | 0.87 | 0.87 | 0.87 | 0.87 | 0.87 | 0.87 |
| BY LENGTH | 9 | −0 | 0.13 | 0.26 | 0.38 | 0.5 | 0.61 | 0.71 | 0.79 | 0.87 | 0.92 | 0.92 | 0.92 | 0.92 | 0.92 | 0.92 | 0.92 |
| MEASUREMENT | 10 | −0.1 | −0 | 0.13 | 0.26 | 0.38 | 0.5 | 0.61 | 0.71 | 0.79 | 0.87 | 0.92 | 0.97 | 0.97 | 0.97 | 0.97 | 0.97 |
| ROLL | 11 | −0.3 | −0.1 | −0 | 0.13 | 0.26 | 0.38 | 0.5 | 0.61 | 0.71 | 0.79 | 0.87 | 0.92 | 0.97 | 0.99 | 0.99 | 0.99 |
| | 12 | −0.4 | −0.3 | −0.1 | −0 | 0.13 | 0.26 | 0.38 | 0.5 | 0.61 | 0.71 | 0.79 | 0.87 | 0.92 | 0.97 | 0.99 | 1 |
| | 13 | −0.5 | −0.4 | −0.3 | −0.1 | −0 | 0.13 | 0.26 | 0.38 | 0.5 | 0.61 | 0.71 | 0.79 | 0.87 | 0.92 | 0.97 | 0.99 |
| | 14 | −0.6 | −0.5 | −0.4 | −0.3 | −0.1 | −0 | 0.13 | 0.26 | 0.38 | 0.5 | 0.61 | 0.71 | 0.79 | 0.87 | 0.92 | 0.97 |
| | 15 | −0.7 | −0.6 | −0.5 | −0.4 | −0.3 | −0.1 | −0 | 0.13 | 0.26 | 0.38 | 0.5 | 0.61 | 0.71 | 0.75 | 0.87 | 0.92 |
| | 16 | −0.8 | −0.7 | −0.6 | −0.5 | −0.4 | −0.3 | −0.1 | −0 | 0.13 | 0.26 | 0.38 | 0.5 | 0.61 | 0.71 | 0.79 | 0.87 |
| | 17 | 0.79 | 0.79 | −0.7 | −0.6 | −0.5 | −0.4 | −0.3 | −0.1 | −0 | 0.13 | 0.26 | 0.38 | 0.5 | 0.61 | 0.71 | 0.79 |
| | 18 | 0.71 | 0.71 | 0.71 | 0.71 | −0.6 | −0.5 | −0.4 | −0.3 | −0.1 | −0 | 0.13 | 0.26 | 0.38 | 0.5 | 0.61 | 0.71 |
| | 19 | 0.61 | 0.61 | 0.61 | 0.61 | 0.61 | 0.61 | −0.5 | −0.4 | −0.3 | −0.1 | −0 | 0.13 | 0.26 | 0.38 | 0.5 | 0.61 |
| | 20 | 0.5 | 0.5 | 0.5 | 0.5 | 0.5 | 0.5 | 0.5 | 0.5 | −0.4 | −0.3 | −0.1 | −0 | 0.13 | 0.26 | 0.38 | 0.5 |
| | 21 | 0.38 | 0.38 | 0.38 | 0.38 | 0.38 | 0.38 | 0.38 | 0.38 | 0.38 | 0.38 | −0.3 | −0.1 | −0 | 0.13 | 0.26 | 0.38 |
| | 22 | 0.26 | 0.26 | 0.26 | 0.26 | 0.26 | 0.26 | 0.26 | 0.26 | 0.26 | 0.26 | 0.26 | 0.26 | −0.1 | −0 | 0.13 | 0.26 |
| | 23 | 0.13 | 0.13 | 0.13 | 0.13 | 0.13 | 0.13 | 0.13 | 0.13 | 0.13 | 0.13 | 0.13 | 0.13 | 0.13 | 0.13 | −0 | 0.13 |
| | 24 | 0 | 0 | 0 | 0 | 0 | 0 | 0 | 0 | 0 | 0 | 0 | 0 | 0 | 0 | 0 | 0 |
| | 25 | −0.1 | −0.1 | −0.1 | −0.1 | −0.1 | −0.1 | −0.1 | −0.1 | −0.1 | −0.1 | −0.1 | −0.1 | −0.1 | −0.1 | −0.1 | −0.1 |
| | 26 | −0.3 | −0.3 | −0.3 | −0.3 | −0.3 | −0.3 | −0.3 | −0.3 | −0.3 | −0.3 | −0.3 | −0.3 | −0.3 | −0.3 | −0.3 | −0.3 |
| | 27 | −0.4 | −0.4 | −0.4 | −0.4 | −0.4 | −0.4 | −0.4 | −0.4 | −0.4 | −0.4 | −0.4 | −0.4 | −0.4 | −0.4 | −0.4 | −0.4 |
| | 28 | −0.5 | −0.5 | −0.5 | −0.5 | −0.5 | −0.5 | −0.5 | −0.5 | −0.5 | −0.5 | −0.5 | −0.5 | −0.5 | −0.5 | −0.5 | −0.5 |
| | 29 | −0.5 | −0.6 | −0.6 | −0.6 | −0.6 | −0.6 | −0.6 | −0.6 | −0.6 | −0.6 | −0.6 | −0.6 | −0.6 | −0.6 | −0.6 | −0.6 |
| | 30 | −0.4 | −0.5 | −0.6 | −0.7 | −0.7 | −0.7 | −0.7 | −0.7 | −0.7 | −0.7 | −0.7 | −0.7 | −0.7 | −0.7 | −0.7 | −0.7 |
| | 31 | −0.3 | −0.4 | −0.5 | −0.6 | −0.7 | −0.8 | −0.8 | −0.8 | −0.8 | −0.8 | −0.8 | −0.8 | −0.8 | −0.8 | −0.8 | −0.8 |
| | 32 | −0.1 | −0.3 | −0.4 | −0.5 | −0.6 | −0.7 | −0.8 | −0.9 | −0.9 | −0.9 | −0.9 | −0.9 | −0.9 | −0.9 | −0.9 | −0.9 |
| | 33 | 0 | −0.1 | −0.3 | −0.4 | −0.5 | −0.6 | −0.7 | −0.8 | −0.9 | −0.9 | −0.9 | −0.9 | −0.9 | −0.9 | −0.9 | −0.9 |
| | 34 | 0.13 | 0 | −0.1 | −0.3 | −0.4 | −0.5 | −0.6 | −0.7 | −0.8 | −0.9 | −0.9 | −1 | −1 | −1 | −1 | −1 |
| | 35 | 0.26 | 0.13 | 0 | −0.1 | −0.3 | −0.4 | −0.5 | −0.6 | −0.7 | −0.8 | −0.9 | −0.9 | −1 | −1 | −1 | −1 |
| | 36 | 0.38 | 0.26 | 0.13 | 0 | −0.1 | −0.3 | −0.4 | −0.5 | −0.6 | −0.7 | −0.8 | −0.9 | −0.9 | −1 | −1 | −1 |
| | 37 | 0.5 | 0.38 | 0.26 | 0.13 | 0 | −0.1 | −0.3 | −0.4 | −0.5 | −0.6 | −0.7 | −0.8 | −0.9 | −0.9 | −1 | −1 |
| | 38 | 0.61 | 0.5 | 0.38 | 0.26 | 0.13 | 0 | −0.1 | −0.3 | −0.4 | −0.5 | −0.6 | −0.7 | −0.8 | −0.9 | −0.9 | −1 |
| | 39 | 0.71 | 0.61 | 0.5 | 0.38 | 0.26 | 0.13 | 0 | −0.1 | −0.3 | −0.4 | −0.5 | −0.6 | −0.7 | −0.8 | −0.9 | −0.9 |
| | 40 | 0.79 | 0.71 | 0.61 | 0.5 | 0.38 | 0.26 | 0.13 | 0 | −0.1 | −0.3 | −0.4 | −0.5 | −0.6 | −0.7 | −0.8 | −0.9 |
| | 41 | −0.8 | 0.79 | 0.71 | 0.61 | 0.5 | 0.38 | 0.26 | 0.13 | 0 | −0.1 | −0.3 | −0.4 | −0.5 | −0.6 | −0.7 | −0.8 |
| | 42 | −0.7 | −0.7 | −0.7 | 0.71 | 0.61 | 0.5 | 0.38 | 0.26 | 0.13 | 0 | −0.1 | −0.3 | −0.4 | −0.5 | −0.6 | −0.7 |
| | 43 | −0.6 | −0.6 | −0.6 | −0.6 | −0.6 | −0.6 | 0.5 | 0.38 | 0.26 | 0.13 | 0 | −0.1 | −0.3 | −0.4 | −0.5 | −0.6 |
| | 44 | −0.5 | −0.5 | −0.5 | −0.5 | −0.5 | −0.5 | −0.5 | −0.5 | 0.38 | 0.26 | 0.13 | 0 | −0.1 | −0.3 | −0.4 | −0.5 |
| | 45 | −0.4 | −0.4 | −0.4 | −0.4 | −0.4 | −0.4 | −0.4 | −0.4 | −0.4 | −0.4 | 0.26 | 0.13 | 0 | −0.1 | −0.3 | −0.4 |
| | 46 | −0.3 | −0.3 | −0.3 | −0.3 | −0.3 | −0.3 | −0.3 | −0.3 | −0.3 | −0.3 | −0.3 | 0.26 | 0.13 | 0 | −0.1 | −0.3 |
| | 47 | −0.1 | −0.1 | −0.1 | −0.1 | −0.1 | −0.1 | −0.1 | −0.1 | −0.1 | −0.1 | −0.1 | −0.1 | −0.1 | 0.13 | 0 | −0.1 |
| | 48 | −0 | −0 | −0 | −0 | −0 | −0 | −0 | −0 | −0 | −0 | −0 | −0 | −0 | −0 | −0 | 0 |

The actual sheet length L2 for calculating the measurement error included in the measured sheet length L2 is calculated by subtracting the values of the above-mentioned sheet lengths L1, L3, and L4 from the sheet length L calculated beforehand. It is assumed that the distance between the first upstream edge sensor 121 and the second upstream edge sensor 122 is shifted by a division unit (i.e., 1/48) in which the circumference length of the length measurement roll 101 is divided into 48 areas.

Each row in the tables 2 and 3 shows the distance between the first upstream edge sensor 121 and the second upstream edge sensor 122 when the distance is shifted by 1/48 (i.e., the division unit). For example, a first row in the tables 2 and 3 shows a case where the distance between the first upstream edge sensor 121 and the second upstream edge sensor 122 is 1/48 of the circumference length LER of the length measurement roll 101. A twelfth row in the tables 2 and 3 shows a case where the distance between the first upstream edge sensor 121 and the second upstream edge sensor 122 is 12/48 (=1/4) of the circumference length LER of the length measurement roll 101. Similarly, a forty-eighth row in the tables 2 and 3 shows a case where the distance between the first upstream edge sensor 121 and the second upstream edge sensor 122 is identical with the circumference length LER of the length measurement roll 101. Each line in the tables 2 and 3 shows a phase difference between phases at the start time and the end time of the measurement by the length measurement roll 101, The controller 200 assumed that the phase difference of the length measurement roll 101 shown in each line in the tables 2 and 3 occurred, and calculated the standard deviation of each row in the tables 2 and 3. Then, the controller 200 calculates an improvement effect of the measurement error of the sheet length L2 calculated based on the pulse signal p2 output from the rotary encoder 103 while changing the distance between the first upstream edge sensor 121 and the second upstream edge sensor 122.

In the calculation of the improvement effect, the controller 200 first calculates the standard deviation of the measurement error of each line from a first line to a forty-eighth line shown in the tables 2 and 3 (The value of the standard deviation will be hereinafter referred to as "standard deviation of each line for the case of three edge sensors").

Next, the controller 200 calculates the standard deviation of the measurement error when the edge sensors are installed on the upstream side and the downstream side of the length measurement roll 101 one by one (The value of the standard deviation will be hereinafter referred to as "standard deviation for the case of two edge sensors"). This standard deviation is calculated by the standard deviation of the measurement error of zeroth row shown in the table 1.

Next, the controller 200 subtracts the value of the standard deviation of each line for the case of three edge sensors from 1, divides the result of the subtraction by the value of the standard deviation for the case of two edge sensors, and multiplies the result of the division by 100. The result of the multiplication shows the improvement effect.

improvement effect={1−(value of standard deviation of each line for case of three edge sensors)}/(value of standard deviation for case of two edge sensors)*100[%]

Figure 14:
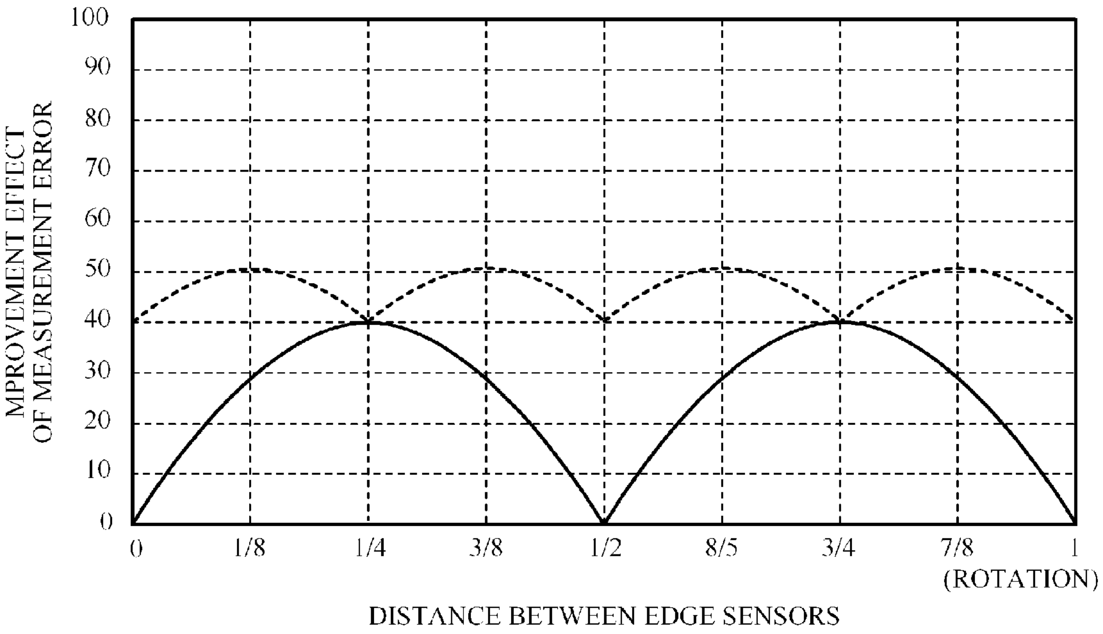
FIG. 14 is a diagram showing a relationship between a distance between the edge sensors, and an improvement effect of the measurement error included in the sheet length measured with the length measurement roll.

A curve shown in a solid line of FIG. 14 indicates the improvement effect of the measurement error of the sheet length L2 depending on the distance between the first upstream edge sensor 121 and the second upstream edge sensor 122. As is clear from FIG. 14, when the distance between the first upstream edge sensor 121 and the second upstream edge sensor 122 is 1/4 and 1/3 of the circumference length LER of the length measurement roll 101, the improvement effect of the measurement error is 40% and becomes a highest state.

In the third exemplary embodiment, the distance between the first upstream edge sensor 121 and the second upstream edge sensor 122 is set to (2n−1)/4 of the circumference length LER, and hence the measurement error included in the sheet length L2 measured with the length measurement roll 101 is further decreased.

Figure 15:
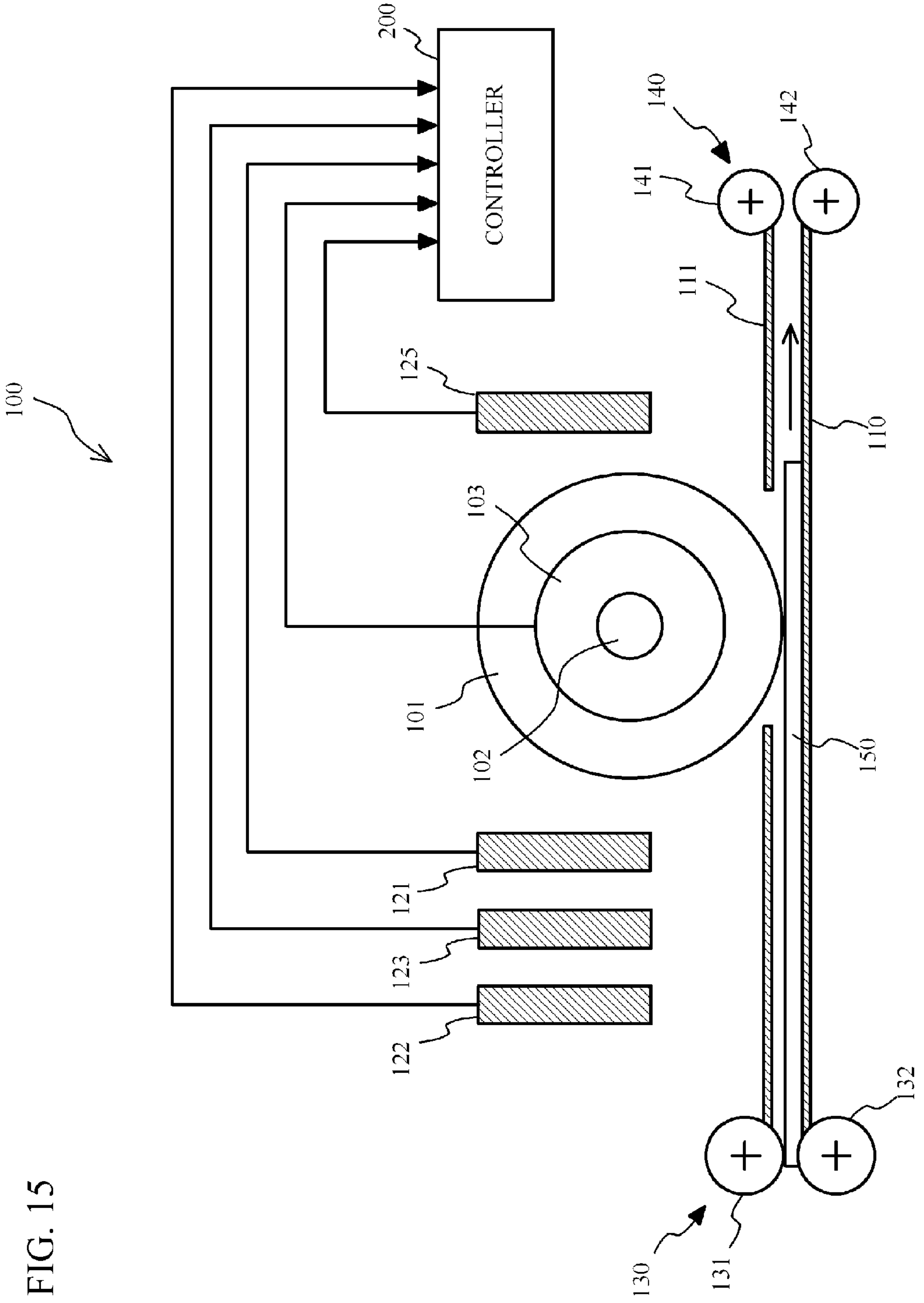
FIG. 15 is a diagram showing an example of a construction of the length measurement apparatus which is comprised of three edge sensors at the upstream side of the length measurement roll.

With respect to the arrangement of the edge sensors, three edge sensors may be installed on the upstream side of the length measurement roll 101 as shown in FIG. 15, or three edge sensors may be installed on the downstream side of the length measurement roll 101 (not shown).

In an example shown in FIG. 15, a third upstream edge sensor 123 is installed between the upstream side of the first upstream edge sensor 121 and the downstream side of the second upstream edge sensor 122. In this case, when the distance between the first upstream edge sensor 121 and the second upstream edge sensor 122 is set to (2n−1)/4 of the circumference length LER as described above, and a distance between the first upstream edge sensor 121 and the third upstream edge sensor 123 is set to (2m−1)/8 (m: any natural number) of the circumference length LER of the length measurement roll 101, a high improvement effect is obtained.

A curve shown in a dotted line of FIG. 14 indicates the improvement effect of the measurement error of the sheet length L2 depending on the distance between the first upstream edge sensor 121 and the third upstream edge sensor 123. As is clear from FIG. 14, when the distance between the first upstream edge sensor 121 and the third upstream edge sensor 123 is 1/8, 3/8, 5/8 and 7/8 of the circumference length LER of the length measurement roll 101, the improvement effect of the measurement error is 51% and becomes a highest state.

In the third exemplary embodiment, the distance between the first upstream edge sensor 121 and the third upstream edge sensor 123 is set to (2m−1)/8 of the circumference length LER, and hence the measurement error included in the sheet length L2 measured with the length measurement roll 101 is further decreased.

(Fourth Exemplary Embodiment)

A description will be given of a fourth exemplary embodiment of the present invention, with reference to the accompanying drawings.

Figure 16:
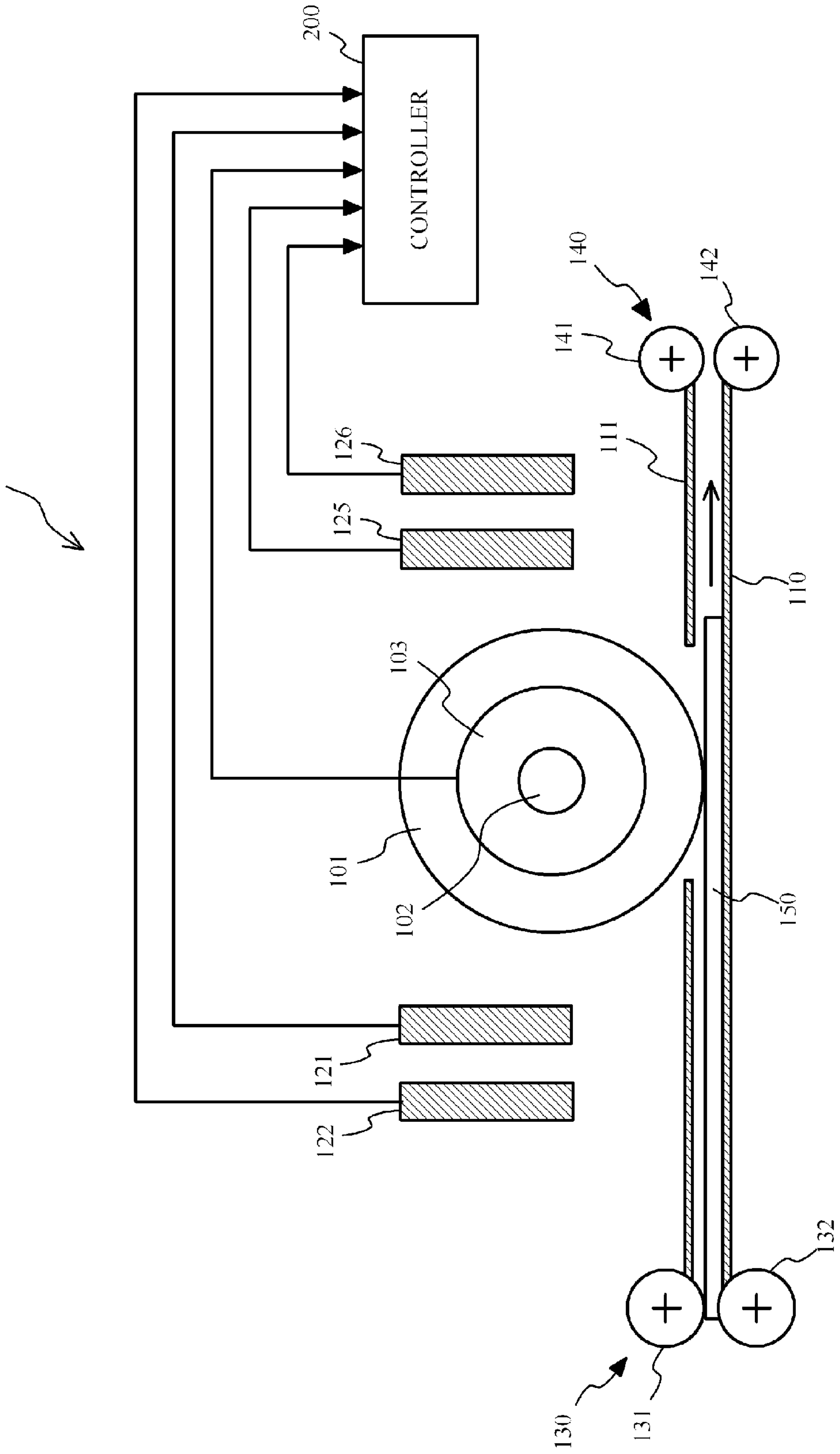
FIG. 16 is a diagram showing an example of a construction of the length measurement apparatus according to a third exemplary embodiment.

FIG. 16 shows the construction of the fourth exemplary embodiment. In the fourth exemplary embodiment, as shown in FIG. 16, the first upstream edge sensor 121 and the second upstream edge sensor 122 are installed on the upstream side of the length measurement roll 101, and the first downstream edge sensor 125 (i.e., the downstream edge sensor 125 of the first exemplary embodiment) and the second downstream edge sensor 126 are installed on the downstream side of the length measurement roll 101.

A distance between the first upstream edge sensor 121 and the second downstream edge sensor 126 is set to the same distance as a distance between the second upstream edge sensor 122 and the first downstream edge sensor 125.

Further, the distance between the first upstream edge sensor 121 and the second upstream edge sensor 122 is set to half of the circumference length LER of the length measurement roll 101, and the distance between the first downstream edge sensor 125 and the second downstream edge sensor 126 is also set to half of the circumference length LER of the length measurement roll 101.

The first upstream edge sensor 121 and the second downstream edge sensor 126 are selected as a pair of sensors prescribing the detection period, and the second upstream edge sensor 122 and the first downstream edge sensor 125 are also selected as a pair of sensors prescribing the detection period. That is, the detection period in which the first upstream edge sensor 121 and the second downstream edge sensor 126 are on indicates the first detection period, and the detection period in which the second upstream edge sensor 122 and the first downstream edge sensor 125 are on indicates the second detection period.

At this time, the controller 200 delays the measurement of the sheet length from the second detection period by a half cycle (i.e., one-half rotation) of the length measurement roll 101, and begins the measurement of the sheet length at the first detection period. In the second detection period, the controller 200 terminates the measurement of the sheet length faster than the first detection period by the half cycle (i.e., one-half rotation) of the length measurement roll 101. That is, the first detection period is shifted from the second detection period by the half cycle (i.e., one-half rotation) of the length measurement roll 101.

Figure 17:
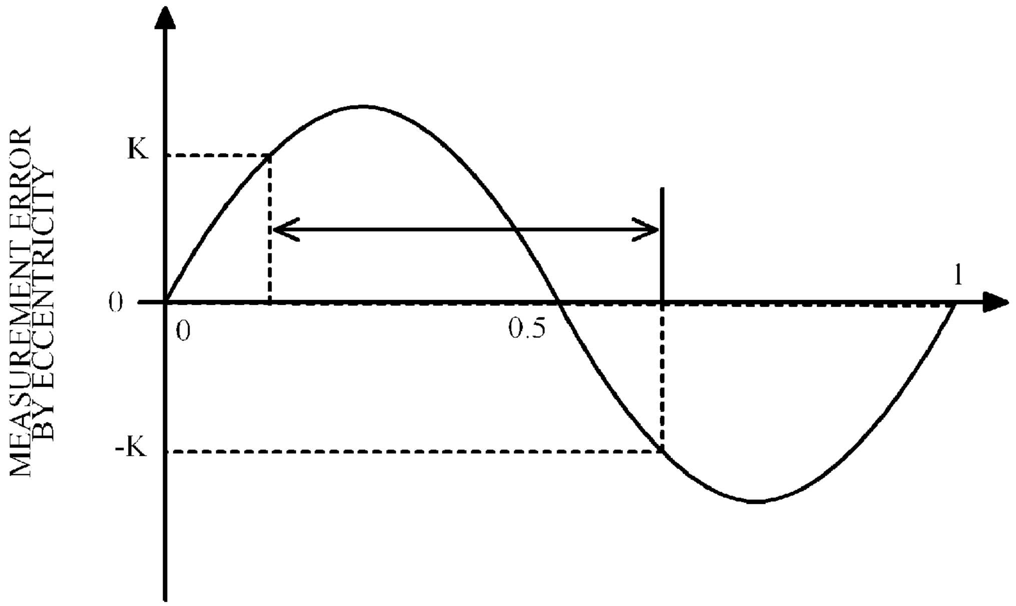
FIG. 17 is a diagram showing a relationship between a phase difference between phases at the start time and the end time of the measurement by the length measurement roll, and the measurement error included in the measured sheet length.

FIG. 17 shows a relationship between a phase difference between phases (i.e., rotational angles) at the start time and the end time of the measurement by the length measurement roll, and the measurement error included in the sheet length L2 measured with the length measurement roll 101.

When the controller 200 calculates an average value of the measurement errors shown in the table 1, for each phase difference between phases at the start time and the end time of the measurement, the average vale of the measurement errors draws a sine curve shown in FIG. 17. Whenever the phase difference of the length measurement roll 101 is changed by $\pi$ (i.e., one-half rotation), a plus measurement error or a minus measurement error appear alternately. When the first detection period is shifted from the second detection period by the half cycle (i.e., one-half rotation) of the length measurement roll 101, the absolute values of the measurement errors corresponding to both of the first and second detection periods are approximately the same as each other. Therefore, the controller 200 shifts the first detection period from the second detection period by the half cycle (i.e., one-half rotation) of the length measurement roll 101, and calculates the average value of the sheet lengths L2 measured at the first and second detection periods. This makes it possible to cancel the measurement error, and to measure the sheet length L2 with high accuracy.

(Fifth Exemplary Embodiment)

A description will be given of a fifth exemplary embodiment of the present invention, with reference to the accompanying drawings.

Figure 18A:
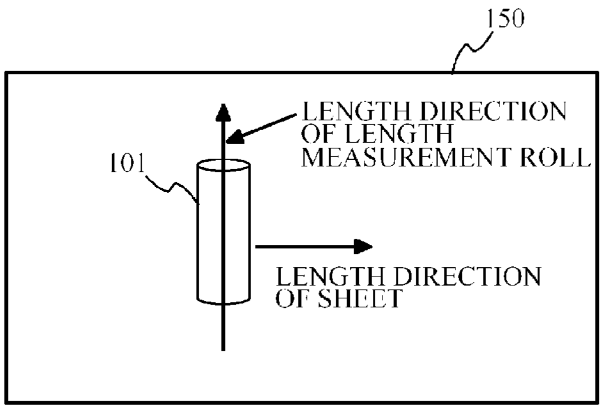
FIG. 18A is a diagram showing a state where a sheet is normally conveyed to a measurement position of the length measurement roll.
Figure 18B:
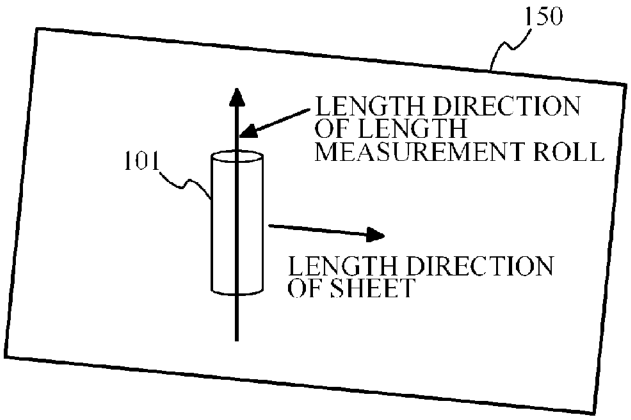
FIG. 18B is a diagram showing a state where a sheet is conveyed to the measurement position in an inclined state.
Figure 18C:
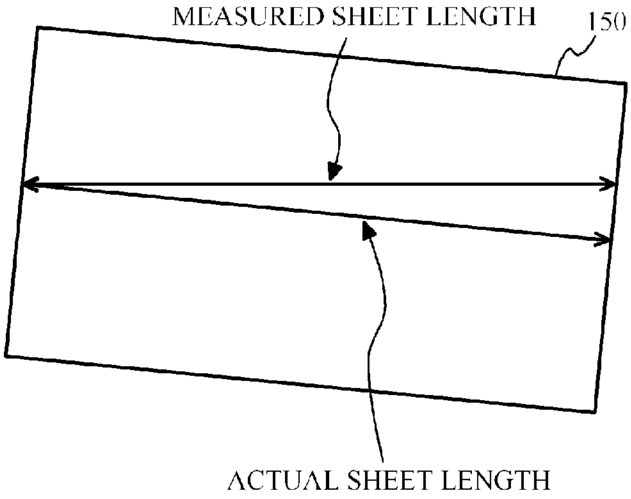
FIG. 18C is a diagram showing the sheet length measured with the length measurement roll when the sheet is conveyed to the measurement position in the inclined state.

In the fifth exemplary embodiment, measures when the sheet 150 is conveyed in an inclined state to the length measurement position of the length measurement roll 101 are taken. When the sheet 150 is conveyed to the length measurement position of the length measurement roll 101 as shown in FIG. 18A, if a length direction of the length measurement roll 101 is vertical to that of the sheet 150, the length of the sheet 150 can be measured with the length measurement roll 101 with high accuracy. However, when the sheet 150 is conveyed in the inclined state as shown in FIG. 18B, the length direction of the length measurement roll 101 is not vertical to that of the sheet 150. In this case, the sheet length measured with the length measurement roll 101 is different from the actual sheet length, as shown in FIG. 18C.

Figure 19A:
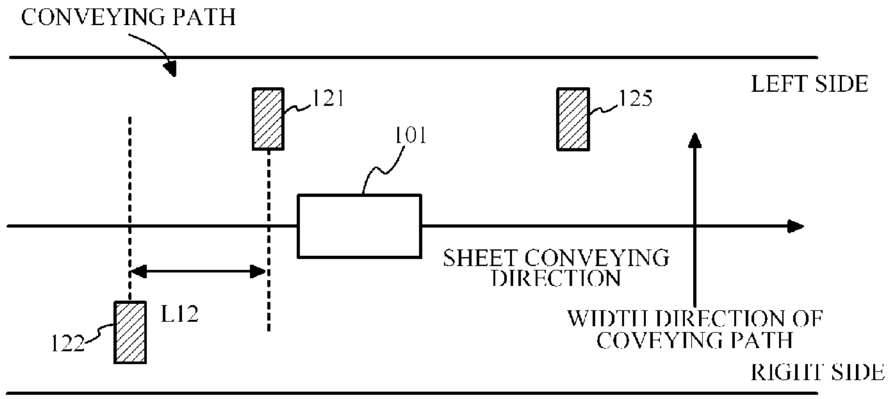
FIGS. 19A to 19C are diagrams showing examples of the arrangement of the edge sensors.

In the fifth exemplary embodiment, the downstream edge sensor 125 and any one of the first upstream edge sensor 121 and the second upstream edge sensor 122 are installed on one side of a width direction of the conveying path vertical to the sheet conveying direction. Another one of the first upstream edge sensor 121 and the second upstream edge sensor 122 is installed on another side of the width direction of the conveying path. FIG. 19A shows a case where the downstream edge sensor 125 and the first upstream edge sensor 121 are installed on the same side of the width direction of the conveying path. In the following description, an upper side of the conveying path shown in FIGS. 19A to 19C, and 20A to 20C (e.g. a side on which the downstream edge sensor 125 and the first upstream edge sensor 121 are installed, in an example shown in FIG. 19A) will be hereinafter referred to as "a left side", and a lower side of the conveying path shown in FIGS. 19A to 19C, and 20A to 20C will be hereinafter referred to as "a right side". Therefore, a part of the sheet located at the left side of the conveying path indicates the left side of the sheet 150, and a part of the sheet located at the right side of the conveying path indicates the right side of the sheet 150.

Figure 20A:
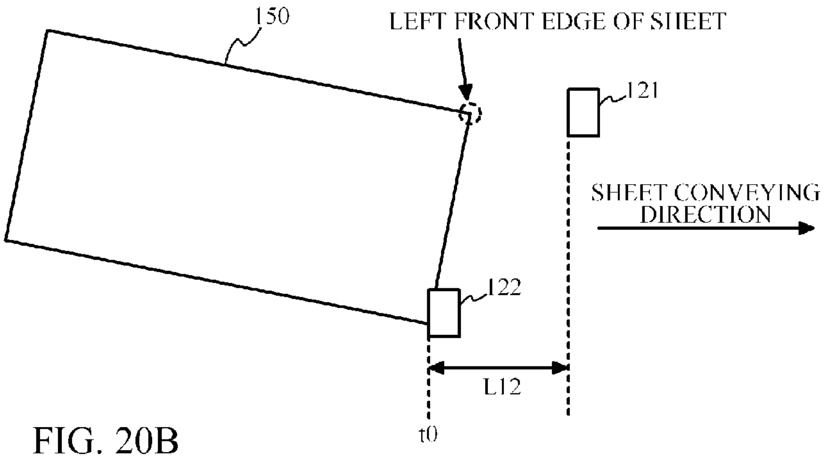
FIG. 20A is a diagram showing a state where one front end of the inclined sheet is detected with a second upstream edge sensor.

A description will be given of, with reference to FIGS. 20A to 20C, a method in which the controller 200 detects the inclination of the sheet 150 based on detection information of the first upstream edge sensor 121 and the second upstream edge sensor 122 shown in FIG. 19A.

Figure 20B:
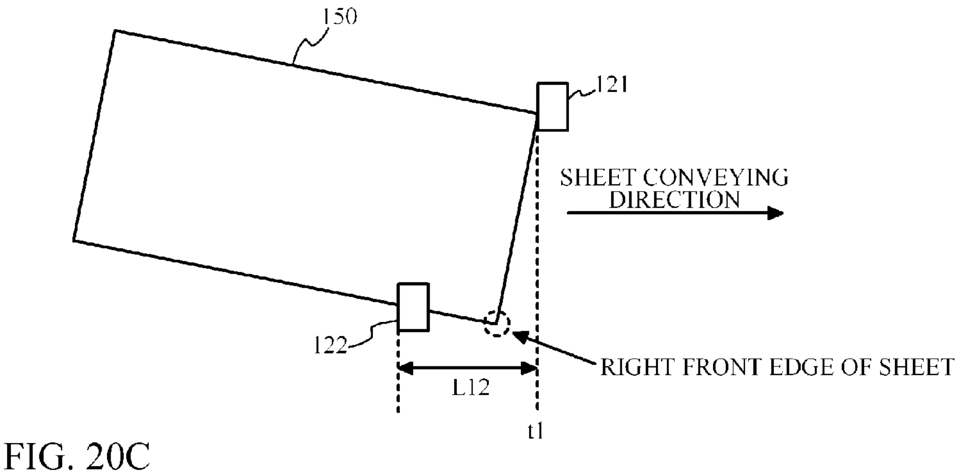
FIG. 20B is a diagram showing a state where another front end of the inclined sheet is detected with the first upstream edge sensor.
Figure 20C:
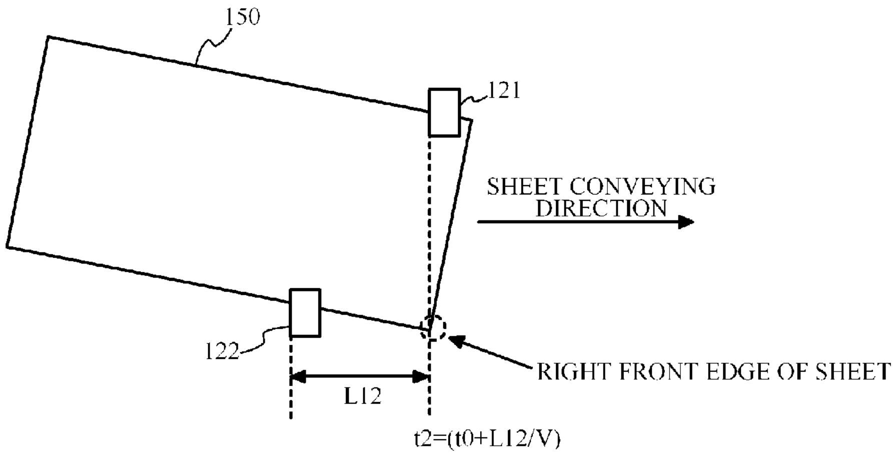
FIG. 20C is a diagram showing a state where another front end of the inclined sheet has reached a detection position of the first upstream edge sensor.

It is assumed that time when the second upstream edge sensor 122 has detected a right front edge of the sheet is "t0" (see FIG. 20A), and time when the first upstream edge sensor 121 has detected a left front edge of the sheet is "t1" (see FIG. 20B). It is assumed that the right side of the sheet 150 reaches the length measurement position of the length measurement roll 101 later than the left side of the sheet 150.

It is assumed that the distance between the first upstream edge sensor 121 and the second upstream edge sensor 122 is "L12", and the conveying speed of the sheet 150 is "V". The distance L12 between the edge sensors and the sheet conveying speed V are predetermined values, and are stored into the RAM 203 beforehand.

The controller 200 calculates time t2 (see FIG. 20C) in which the right front edge of the sheet reaches a line that extends from the detection position of the first upstream edge sensor 121, and is vertical to the sheet conveying direction, by using the time t0 and t1 detected by the edge sensors. The time t2 in which the right front edge of the sheet reaches the line is calculated by the following expression (1).

$$t2=(t0+L12/V) \quad (1)$$

The controller 200 calculates the inclination of the sheet 150 from a difference between the time t1 in which the left front edge of the sheet passes through the detection position of the first upstream edge sensor 121, and the time t2 in which the right front edge of the sheet reaches the line that extends from the detection position of the first upstream edge sensor 121, and is vertical to the sheet conveying direction. Further, the controller 200 calculates the actual length of the sheet 150 by correcting the sheet length L, which is calculated by adding the above-mentioned sheet lengths L1 to L4 to each other, by the calculated inclination.

Figure 19B:
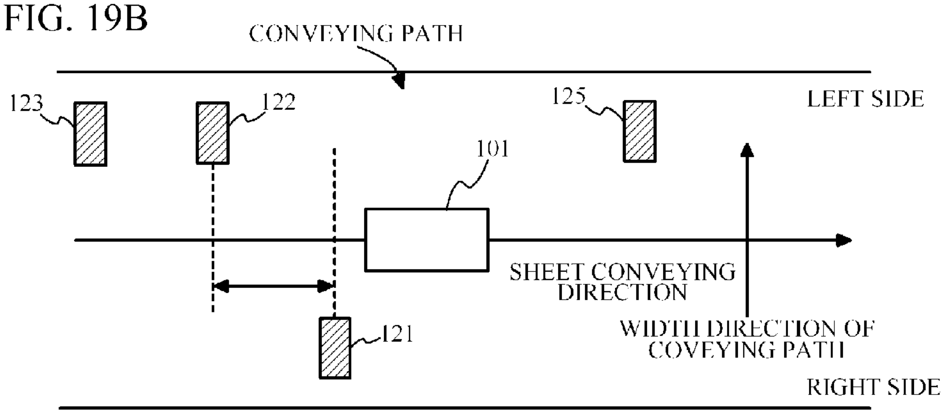
Figure 19C:
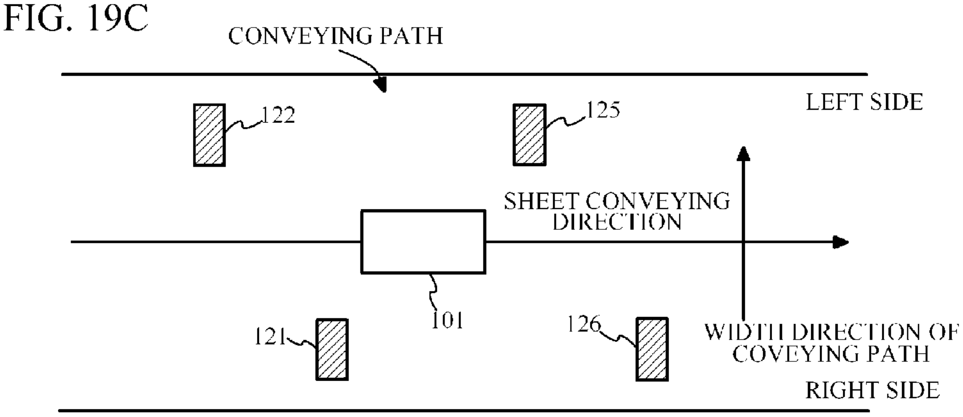

The arrangement of the edge sensors may be the arrangement shown in not only FIG. 19A, but also FIG. 19B or 19C. FIG. 19B shows an example of the arrangement of the edge sensors when three edge sensors are disposed on the upstream of the length measurement roll 101. In the example shown in FIG. 19B, the first upstream edge sensor 121 is disposed on the right side of the width direction of the conveying path, and the second upstream edge sensor 122 and the third upstream edge sensor 123 are disposed on the left side of the width direction of the conveying path. Also, the downstream edge sensor 125 is disposed on the left side of the width direction of the conveying path.

FIG. 19C shows an example of the arrangement of the edge sensors when two edge sensors are disposed on the upstream of the length measurement roll 101, and another two edge sensors are disposed on the downstream of the length measurement roll 101. In the example shown in FIG. 19C, the first upstream edge sensor 121 and the second downstream edge sensor 126 are disposed on the right side of the width direction of the conveying path. The second upstream edge sensor 122 and the first downstream edge sensor 125 are disposed on the left side of the width direction of the conveying path.

The arrangement of the edge sensor can be changed besides FIGS. 19A to 19C. That is, at least one edge sensor may be disposed on each side of the width direction of the conveying path.

The length measurement apparatus 100 can be used for another usage other than the usage in which the sheet length is measured in the image forming apparatus. For example, the length measurement apparatus 100 can be used to measure the length of a sheet-type product on a manufacturing line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A length measurement apparatus comprising:

a length measurement roll that comes in contact with a sheet conveyed on a conveying path, and rotates along with the conveyance of the sheet;

a first sensor that is disposed on an upstream side of the length measurement roll in a sheet conveying direction, and detects the sheet conveyed on the conveying path;

a second sensor that is disposed on the upstream side or a downstream side of the length measurement roll in the sheet conveying direction, and detects the sheet conveyed on the conveying path;

a third sensor that that is disposed on the downstream side of the length measurement roll in the sheet conveying direction, and detects the sheet conveyed on the conveying path;

a measurement portion that measures a first sheet length of the sheet based on a rotational amount of the length measurement roll for a first detection period in which the first and third sensors detect the sheet, and measures a second sheet length of the sheet based on a rotational amount of the length measurement roll for a second detection period in which the second sensor and any one of the first and third sensors detect the sheet, the any one of the first and third sensors being disposed at a position opposite to the second sensor via the length measurement roll in the sheet conveying direction; and a whole length calculation portion that selects the sheet length nearer to integral multiples of the circumference length of the length measurement roll from the first and second sheet lengths, and calculates the whole length of the sheet in the sheet conveying direction by using the selected sheet length.

2. A length measurement apparatus comprising:

a length measurement roll that comes in contact with a sheet conveyed on a conveying path, and rotates along with the conveyance of the sheet;

a first sensor that is disposed on an upstream side of the length measurement roll in a sheet conveying direction, and detects the sheet conveyed on the conveying path;

a second sensor that is disposed on the upstream side or a downstream side of the length measurement roll in the sheet conveying direction, and detects the sheet conveyed on the conveying path;

a third sensor that that is disposed on the downstream side of the length measurement roll in the sheet conveying direction, and detects the sheet conveyed on the conveying path;

a storage portion that stores standardized sizes of sheets;

a reception portion that receives selection of a sheet on which an image is formed;

a predicted value calculation portion that reads the standardized size of the selected sheet from the storage portion, and calculates predicted values of the sheet length based on the read standardized size, for a first detection period in which the first and third sensors detect the sheet, and for a second detection period in which the second sensor and any one of the first and third sensors detect the sheet, the any one of the first and third sensors being disposed at a position opposite to the second sensor via the length measurement roll in the sheet conveying direction;

a selection portion that selects a predicted value of the sheet length nearer to integral multiples of the circumference length of the length measurement roll from the predicted values of the sheet lengths of the first and second detection periods, and selects any one of the first and second detection periods corresponding to the selected predicted value of the sheet length as a detection period of the sheet length; and a whole length calculation portion that calculates the whole length of the sheet in the sheet conveying direction based on a rotational amount of the length measurement roll for the selected detection period.

3. The length measurement apparatus according to claim 1, wherein the second sensor is disposed away from any one of the first and third sensors by (2n−1)/4 (n: any natural number) of the circumference length of the length measurement roll, the any one of the first and third sensors being disposed on the same side as the second sensor to the length measurement roll in the sheet conveying direction.

4. The length measurement apparatus according to claim 2, wherein the second sensor is disposed away from any one of the first and third sensors by (2n−1)/4 (n: any natural number) of the circumference length of the length measurement roll, the any one of the first and third sensors being disposed on the same side as the second sensor to the length measurement roll in the sheet conveying direction.

5. The length measurement apparatus according to claim 1, wherein at least one of the first sensor, the second sensor, and the third sensor is disposed on one side of a width direction vertical to the sheet conveying direction of the sheet conveying path, and at least one of the remaining sensors is disposed on another side of the width direction vertical to the sheet conveying direction of the sheet conveying path, and wherein the length measurement apparatus further comprises a correction portion that detects the inclination of the sheet conveyed on the conveying path based on detection timing of the sheet detected by the sensors disposed on the one side and the another side of the width direction, and corrects the whole length of the sheet in the sheet conveying direction based on the detected inclination.

6. The length measurement apparatus according to claim 2, wherein at least one of the first sensor, the second sensor, and the third sensor is disposed on one side of a width direction vertical to the sheet conveying direction of the sheet conveying path, and at least one of the remaining sensors is disposed on another side of the width direction vertical to the sheet conveying direction of the sheet conveying path, and wherein the length measurement apparatus further comprises a correction portion that detects the inclination of the sheet conveyed on the conveying path based on detection timing of the sheet detected by the sensors disposed on the one side and the another side of the width direction, and corrects the whole length of the sheet in the sheet conveying direction based on the detected inclination.

7. The length measurement apparatus according to claim 3, further comprising a fourth sensor that is disposed on the same side as the second sensor to the length measurement roll in the sheet conveying direction, and detects the sheet conveyed on the conveying path, wherein the fourth sensor is disposed away from the second sensor or the any one of the first and third sensors by (2m−1)/8 (m: any natural number) of the circumference length of the length measurement roll, the any one of the first and third sensors being disposed on the same side as the second sensor to the length measurement roll in the sheet conveying direction.

8. The length measurement apparatus according to claim 4, further comprising a fourth sensor that is disposed on the same side as the second sensor to the length measurement roll in the sheet conveying direction, and detects the sheet conveyed on the conveying path, wherein the fourth sensor is disposed away from the second sensor or the any one of the first and third sensors by (2m−1)/8 (m: any natural number) of the circumference length of the length measurement roll, the any one of the first and third sensors being disposed on the same side as the second sensor to the length measurement roll in the sheet conveying direction.

9. The length measurement apparatus according to claim 7, wherein at least one of the first sensor, the second sensor, the third sensor, and the fourth sensor is disposed on one side of a width direction vertical to the sheet conveying direction of the sheet conveying path, and at least one of the remaining sensors is disposed on another side of the width direction vertical to the sheet conveying direction of the sheet conveying path, and wherein the length measurement apparatus further comprises a correction portion that detects the inclination of the sheet conveyed on the conveying path based on detection timing of the sheet detected by the sensors disposed on the one side and the another side of the width direction, and corrects the whole length of the sheet in the sheet conveying direction based on the detected inclination.

10. The length measurement apparatus according to claim 8, wherein at least one of the first sensor, the second sensor, the third sensor, and the fourth sensor is disposed on one side of a width direction vertical to the sheet conveying direction of the sheet conveying path, and at least one of the remaining sensors is disposed on another side of the width direction vertical to the sheet conveying direction of the sheet conveying path, and wherein the length measurement apparatus further comprises a correction portion that detects the inclination of the sheet conveyed on the conveying path based on detection timing of the sheet detected by the sensors disposed on the one side and the another side of the width direction, and corrects the whole length of the sheet in the sheet conveying direction based on the detected inclination.

11. A length measurement apparatus comprising:

a length measurement roll that comes in contact with a sheet conveyed on a conveying path, and rotates along with the conveyance of the sheet;

a first upstream sensor that is disposed on an upstream side of the length measurement roll in a sheet conveying direction, and detects the sheet conveyed on the conveying path;

a second upstream sensor that is disposed on the upstream side of the first upstream sensor in the sheet conveying direction and disposed away from the first upstream sensor by half of the circumference length of the length measurement roll, and detects the sheet conveyed on the conveying path;

a first downstream sensor that is disposed on a downstream side of the length measurement roll in the sheet conveying direction, and detects the sheet conveyed on the conveying path;

a second downstream sensor that is disposed on the downstream side of the first downstream sensor in the sheet conveying direction and disposed away from the first downstream sensor by half of the circumference length of the length measurement roll, and detects the sheet conveyed on the conveying path;

a measurement portion that measures a sheet length of the sheet based on a rotational amount of the length measurement roll for a first detection period in which the first upstream and second downstream sensors detect the sheet, and measures a sheet length of the sheet based on a rotational amount of the length measurement roll for a second detection period in which the second upstream and first downstream sensors detect the sheet; and a whole length calculation portion that calculates an average value of the sheet lengths measured for the first and second detection periods, and calculates the whole length of the sheet in the sheet conveying direction by using the calculated average value of the sheet lengths.

12. The length measurement apparatus according to claim 11, wherein at least one of the first upstream sensor, the second upstream sensor, the first downstream sensor, and the second downstream sensor is disposed on one side of a width direction vertical to the sheet conveying direction of the sheet conveying path, and at least one of the remaining sensors is disposed on another side of the width direction vertical to the sheet conveying direction of the sheet conveying path, and wherein the length measurement apparatus further comprises a correction portion that detects the inclination of the sheet conveyed on the conveying path based on detection timing of the sheet detected by the sensors disposed on the one side and the another side of the width direction, and corrects the whole length of the sheet in the sheet conveying direction based on the detected inclination.

13. An image forming apparatus comprising:

a length measurement apparatus including:

a length measurement roll that comes in contact with a sheet conveyed on a conveying path, and rotates along with the conveyance of the sheet;

a first sensor that is disposed on an upstream side of the length measurement roll in a sheet conveying direction, and detects the sheet conveyed on the conveying path;

a second sensor that is disposed on the upstream side or a downstream side of the length measurement roll in the sheet conveying direction, and detects the sheet conveyed on the conveying path;

a third sensor that that is disposed on the downstream side of the length measurement roll in the sheet conveying direction, and detects the sheet conveyed on the conveying path;

a measurement portion that measures a sheet length of the sheet based on a rotational amount of the length measurement roll for a first detection period in which the first and third sensors detect the sheet, and measures a sheet length of the sheet based on a rotational amount of the length measurement roll for a second detection period in which the second sensor and any one of the first and third sensors detect the sheet, the any one of the first and third sensors being disposed at a position opposite to the second sensor via the length measurement roll in the sheet conveying direction; and a whole length calculation portion that selects the sheet length nearer to integral multiples of the circumference length of the length measurement roll from the sheet lengths measured for the first and second detection periods, and calculates the whole length of the sheet in the sheet conveying direction by using the selected sheet length; and an image forming portion that controls a forming condition of an image formed on the sheet based on the whole length of the sheet in the sheet conveying direction, calculated by the length measurement apparatus.

14. An image forming apparatus comprising:

a length measurement apparatus including:

a length measurement roll that comes in contact with a sheet conveyed on a conveying path, and rotates along with the conveyance of the sheet;

a first sensor that is disposed on an upstream side of the length measurement roll in a sheet conveying direction, and detects the sheet conveyed on the conveying path;

a second sensor that is disposed on the upstream side or a downstream side of the length measurement roll in the sheet conveying direction, and detects the sheet conveyed on the conveying path;

a third sensor that that is disposed on the downstream side of the length measurement roll in the sheet conveying direction, and detects the sheet conveyed on the conveying path;

a storage portion that stores standardized sizes of sheets;

a reception portion that receives selection of a sheet on which an image is formed;

a predicted value calculation portion that reads the standardized size of the selected sheet from the storage portion, and calculates predicted values of the sheet length based on the read standardized size, for a first detection period in which the first and third sensors detect the sheet, and for a second detection period in which the second sensor and any one of the first and third sensors detect the sheet, the any one of the first and third sensors being disposed at a position opposite to the second sensor via the length measurement roll in the sheet conveying direction;

a selection portion that selects a predicted value of the sheet length nearer to integral multiples of the circumference length of the length measurement roll from the predicted values of the sheet lengths of the first and second detection periods, and selects any one of the first and second detection periods corresponding to the selected predicted value of the sheet length as a detection period of the sheet length; and a whole length calculation portion that calculates the whole length of the sheet in the sheet conveying direction based on a rotational amount of the length measurement roll for the selected detection period; and an image forming portion that controls a forming condition of an image formed on the sheet based on the whole length of the sheet in the sheet conveying direction, calculated by the length measurement apparatus.

15. An image forming apparatus comprising:

a length measurement apparatus including:

a length measurement roll that comes in contact with a sheet conveyed on a conveying path, and rotates along with the conveyance of the sheet;

a first upstream sensor that is disposed on an upstream side of the length measurement roll in a sheet conveying direction, and detects the sheet conveyed on the conveying path;

a second upstream sensor that is disposed on the upstream side of the first upstream sensor in the sheet conveying direction and disposed away from the first upstream sensor by half of the circumference length of the length measurement roll, and detects the sheet conveyed on the conveying path;

a first downstream sensor that is disposed on a downstream side of the length measurement roll in the sheet conveying direction, and detects the sheet conveyed on the conveying path;

a second downstream sensor that is disposed on the downstream side of the first downstream sensor in the sheet conveying direction and disposed away from the first downstream sensor by half of the circumference length of the length measurement roll, and detects the sheet conveyed on the conveying path;

a measurement portion that measures a sheet length of the sheet based on a rotational amount of the length measurement roll for a first detection period in which the first upstream and second downstream sensors detect the sheet, and measures a sheet length of the sheet based on a rotational amount of the length measurement roll for a second detection period in which the second upstream and first downstream sensors detect the sheet; and a whole length calculation portion that calculates an average value of the sheet lengths measured for the first and second detection periods, and calculates the whole length of the sheet in the sheet conveying direction by using the calculated average value of the sheet lengths; and an image forming portion that controls a forming condition of an image formed on the sheet based on the whole length of the sheet in the sheet conveying direction, calculated by the length measurement apparatus.

16. An image forming apparatus according to claim 13, wherein the image forming portion comprises an image forming unit that forms images on the sheet, an inversion unit that inverts both surfaces of the sheet after an image is formed on a first surface of the sheet, and a control unit that controls the forming condition of the image formed on a second surface of the sheet based on the whole length of the sheet in the sheet conveying direction, calculated by the length measurement apparatus, wherein the length measurement apparatus calculates the whole length of the sheet, in which the image is formed on the first surface by the image forming unit, in the sheet conveying direction.

17. An image forming apparatus according to claim 14, wherein the image forming portion comprises an image forming unit that forms images on the sheet, an inversion unit that inverts both surfaces of the sheet after an image is formed on a first surface of the sheet, and a control unit that controls the forming condition of the image formed on a second surface of the sheet based on the whole length of the sheet in the sheet conveying direction, calculated by the length measurement apparatus, wherein the length measurement apparatus calculates the whole length of the sheet, in which the image is formed on the first surface by the image forming unit, in the sheet conveying direction.

18. An image forming apparatus according to claim 15, wherein the image forming portion comprises an image forming unit that forms images on the sheet, an inversion unit that inverts both surfaces of the sheet after an image is formed on a first surface of the sheet, and a control unit that controls the forming condition of the image formed on a second surface of the sheet based on the whole length of the sheet in the sheet conveying direction, calculated by the length measurement apparatus, wherein the length measurement apparatus calculates the whole length of the sheet, in which the image is formed on the first surface by the image forming unit, in the sheet conveying direction.

* * * * *